US009418678B2

(12) United States Patent
Sekiya et al.

(10) Patent No.: US 9,418,678 B2
(45) Date of Patent: Aug. 16, 2016

(54) SOUND PROCESSING DEVICE, SOUND PROCESSING METHOD, AND PROGRAM

(75) Inventors: Toshiyuki Sekiya, Tokyo (JP); Mototsugu Abe, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 1132 days.

(21) Appl. No.: 12/835,976

(22) Filed: Jul. 14, 2010

(65) Prior Publication Data

US 2011/0022361 A1 Jan. 27, 2011

(30) Foreign Application Priority Data

Jul. 22, 2009 (JP) ................................ P2009-171054

(51) Int. Cl.
*G06F 17/00* (2006.01)
*H04B 15/00* (2006.01)
*G06F 17/18* (2006.01)
*G06F 19/00* (2011.01)
*G10L 21/0272* (2013.01)
*G10L 21/0308* (2013.01)
*H04R 3/00* (2006.01)

(52) U.S. Cl.
CPC ......... *G10L 21/0272* (2013.01); *G10L 21/0308* (2013.01); *H04R 3/005* (2013.01)

(58) Field of Classification Search
CPC ......... G06F 15/00; G06F 17/10; G06F 17/11; G06F 17/12; G06F 17/13; G10L 21/0272; G10L 21/028; G10L 21/0308; H04R 3/00; H04R 3/005
USPC ..................... 700/94; 702/190, 191; 381/119, 381/94.1-94.3, 94.7, 66; 704/201, E21.004
See application file for complete search history.

(56) References Cited

U.S. PATENT DOCUMENTS

| | | | | |
|---|---|---|---|---|
| 6,002,776 | A * | 12/1999 | Bhadkamkar et al. | 381/66 |
| 6,625,587 | B1 * | 9/2003 | Erten et al. | 706/22 |
| 7,315,816 | B2 * | 1/2008 | Gotanda et al. | 704/226 |
| 7,496,482 | B2 * | 2/2009 | Araki et al. | 702/190 |
| 8,175,871 | B2 * | 5/2012 | Wang et al. | 704/227 |
| 8,694,306 | B1 * | 4/2014 | Short et al. | 704/200 |
| 2003/0033094 | A1 * | 2/2003 | Huang | 702/39 |
| 2004/0040621 | A1 * | 3/2004 | Gotanda et al. | 141/330 |
| 2005/0060142 | A1 * | 3/2005 | Visser et al. | 704/201 |
| 2006/0058983 | A1 * | 3/2006 | Araki et al. | 702/190 |
| 2007/0025556 | A1 * | 2/2007 | Hiekata | 381/17 |
| 2007/0025564 | A1 * | 2/2007 | Hiekata et al. | 381/94.2 |
| 2007/0083365 | A1 * | 4/2007 | Shmunk | 704/232 |
| 2007/0100615 | A1 * | 5/2007 | Gotanda et al. | 704/226 |

(Continued)

FOREIGN PATENT DOCUMENTS

| | | |
|---|---|---|
| JP | 2006-154314 | 6/2006 |
| JP | 3949150 | 4/2007 |

*Primary Examiner* — Xu Mei
(74) *Attorney, Agent, or Firm* — Chip Law Group

(57) ABSTRACT

A sound processing device includes: a nonlinear processing unit that outputs a plurality of sound signals including sound sources existing in predetermined areas by performing a non-linear process for a plurality of observed signals that are generated by a plurality of sound sources and are observed by a plurality of sensors; a signal selecting unit that selects a sound signal including a specific sound source from among the plurality of sound signals output by the nonlinear processing unit and the observed signal including the plurality of sound sources; and a sound separating unit that separates a sound signal including the specific sound source that is selected by the signal selecting unit from the observed signal selected by the signal selecting unit.

11 Claims, 18 Drawing Sheets

(56) References Cited

U.S. PATENT DOCUMENTS

| | | | | |
|---|---|---|---|---|
| 2007/0133811 | A1* | 6/2007 | Hashimoto et al. | 381/22 |
| 2007/0185705 | A1* | 8/2007 | Hiroe | 704/200 |
| 2008/0040101 | A1* | 2/2008 | Hayakawa | 704/203 |
| 2008/0208538 | A1* | 8/2008 | Visser et al. | 702/190 |
| 2008/0228470 | A1* | 9/2008 | Hiroe | 704/200 |
| 2008/0267423 | A1* | 10/2008 | Hiekata et al. | 381/92 |
| 2009/0012779 | A1* | 1/2009 | Ikeda et al. | 704/205 |
| 2009/0043588 | A1* | 2/2009 | Takeda et al. | 704/278 |
| 2009/0086998 | A1* | 4/2009 | Jeong et al. | 381/119 |
| 2009/0222262 | A1* | 9/2009 | Kim et al. | 704/231 |
| 2009/0306973 | A1* | 12/2009 | Hiekata et al. | 704/205 |
| 2009/0310444 | A1* | 12/2009 | Hiroe | 367/125 |
| 2010/0158271 | A1* | 6/2010 | Park et al. | 381/94.7 |

* cited by examiner

SOUND PROCESSING DEVICE, SOUND PROCESSING METHOD, AND PROGRAM

BACKGROUND OF THE INVENTION

1. Field of the Invention

The present invention relates to a sound processing device, a sound processing method, and a program, and more particularly, to a sound processing device, a sound processing method, and a program that perform sound separation and noise elimination by using an independent component analysis (ICA).

2. Description of the Related Art

Recently, there is a technology of separating a signal transmitted from one or more sound sources from mixed sounds including sounds transmitted from a plurality of sound sources by using a BBS (Blind Source Separation) method that is based on an ICA (Independent Component Analysis) method. For example, in order to reduce the remaining noise that is difficult to be eliminated by sound source separation using the ICA, a technology using an nonlinear process after the sound source separation using the ICA is disclosed (for example, Japanese Unexamined Patent Application Publication No. 2006-154314).

However, a case where the non-linear process is performed after the ICA process is premised on the separation process using the ICA being performed well at the former stage. Accordingly, in a case where it is difficult to achieve sound source separation to some degree in the separation process using the ICA, there is a problem where it is difficult to expect sufficient performance improvement by performing the nonlinear process at the latter stage.

Thus, a technology of performing a nonlinear process at a stage prior to the sound source separation using the ICA is disclosed (for example, Japanese Patent No. 3,949,150). According to Japanese Patent No. 3,949,150, even in a case where the number N of signal sources and the number M of sensors are in a relationship of N>M, mixed signals can be separated with high quality. In the sound source separation using the ICA, in order extract each signal with high precision, it is necessary that M≥N. Thus, in Japanese Patent No. 3,949,150, assuming that N sound sources do not simultaneously exist, time-frequency components that include only V (V≤M) sound sources are extracted from an observed signal in which N sound sources are mixed by performing binary masking or the like. Then, by applying the ICA or the like for the limited time-frequency component, each sound source can be extracted.

SUMMARY OF THE INVENTION

However, in Japanese Patent No. 3,949,150, a condition of 2≤V≤M is formed, and each individual sound source can be extracted. However, there is a problem in that necessary signals are mixed after individual sound sources are extracted even in a case where elimination from the mixed signal of a signal transmitted from one sound source is desired.

It is desirable to provide a new and advanced sound processing device, a sound processing method, and a program that are capable of effectively eliminating a signal including a specific sound source from a mixed signal.

According to an embodiment of the present invention there is provided a sound processing device including: a nonlinear processing unit that outputs a plurality of sound signals including sound sources existing in predetermined areas by performing a nonlinear process for a plurality of observed signals that are generated by a plurality of sound sources and are observed by a plurality of sensors; a signal selecting unit that selects a sound signal including a specific sound source from among the plurality of sound signals output by the nonlinear processing unit and the observed signal including the plurality of sound sources; and a sound separating unit that separates a sound signal including the specific sound source that is selected by the signal selecting unit from the observed signal selected by the signal selecting unit.

In addition, the above-described sound processing device may further include a frequency domain converting unit that converts the plurality of observed signals generated from the plurality of sound sources and observed by the plurality of sensors into signal values of a frequency domain, wherein the nonlinear processing unit outputs a plurality of sound signals including a sound source existing in a specific area by performing a nonlinear process for the observed signal values converted by the frequency domain converting unit.

In addition, it may be configured that a specific sound source having high independency is included in the plurality of sound sources that are observed by the plurality of sensors, the nonlinear processing unit outputs a sound signal representing a sound component of the specific sound source having high independency, the signal selecting unit selects an observed signal including the specific sound source and the sound sources other than the specific sound source from among a sound signal representing a sound component of the specific sound source output by the nonlinear processing unit and the plurality of observed signals, and the sound separating unit eliminates the sound component of the specific sound source from the observed signal selected by the signal selecting unit.

In addition, it may be configured that the nonlinear processing unit outputs a sound signal representing a sound component that exists in an area in which a first sound source is generated, the signal selecting unit selects an observed signal including a second sound source that is observed by a sensor located in an area in which the first sound source and a sound source other than the first sound source are generated, from among the sound signal representing the sound component, which is output by the nonlinear processing unit and exists in the area in which the first sound source is generated, and the plurality of observed signals, and the sound separating unit eliminates the sound component of the first sound source from the observed signal, which includes the second sound source, selected by the signal selecting unit.

In addition, the nonlinear processing unit may include: phase calculating means that calculates a phase difference between the plurality of sensors for each time-frequency component; determination means that determines an area from which each time-frequency component originates based on the phase difference between the plurality of sensors that is calculated by the phase calculating means; and calculation means that performs predetermined weighting for each time-frequency component observed by the sensor based on a determination result of the determination means.

In addition, the phase calculating means may calculate the phase difference between the sensors by using a delay between the sensors.

In addition, it may be configured that the plurality of observed signals corresponding to the number of the plurality of sensors are observed, and the signal selecting unit selects the sound signals corresponding to a number that becomes the number of the plurality of sensors together with one observed signal, from among the plurality of sound signals output by the nonlinear processing unit.

In addition, it may be configured that the nonlinear processing unit outputs a first sound signal representing the sound component of the specific sound source having high independency and a second sound signal that does not include all the sound components of three sound sources by performing a nonlinear process for three observed signals generated from three sound sources including the specific sound source having high independency and observed by three sensors, wherein the signal selecting unit selects the first sound signal and the second sound signal that are output by the non-linear processing unit and the observed signal that includes the specific sound source and a sound source other than the specific sound source, and wherein the sound separating unit eliminates the sound component of the specific sound source from the observed signal selected by the signal selecting unit.

In addition, it may be configured that the nonlinear processing unit outputs a sound signal representing the sound component of the specific sound source having high independency by performing a nonlinear process for two observed signals generated from three sound sources including the specific sound source having high independency and observed by two sensors, the signal selecting unit selects the sound signal output by the nonlinear processing unit and the observed signal that includes the specific sound source and a sound source other than the specific sound source, and the sound separating unit eliminates the sound component of the specific sound source from the observed signal selected by the signal selecting unit.

According to another embodiment of the present invention, there is provided a sound processing method including the steps of: outputting a plurality of sound signals including sound sources existing in predetermined areas by performing a nonlinear process for a plurality of observed signals that are generated by a plurality of sound sources and are observed by a plurality of sensors; selecting a sound signal including a specific sound source from among the plurality of sound signals output by the nonlinear process and the observed signal including the plurality of sound sources; and separating a sound signal including the specific sound source that is selected in the selecting of a sound signal and the observed signal from the selected observed signal.

According to further another embodiment of the present invention, there is provided a program allowing a computer to serve as a sound processing device including: a nonlinear processing unit that outputs a plurality of sound signals including sound sources existing in predetermined areas by performing a nonlinear process for a plurality of observed signals that are generated by a plurality of sound sources and are observed by a plurality of sensors; a signal selecting unit that selects a sound signal including a specific sound source from among the plurality of sound signals output by the nonlinear processing unit and the observed signal including the plurality of sound sources; and a sound separating unit that separates a sound signal including the specific sound source that is selected by the signal selecting unit from the observed signal selected by the signal selecting unit.

As described above, according to an embodiment of the present invention, a signal including a sound source having high independency can be effectively eliminated from a mixed signal.

DESCRIPTION OF THE PREFERRED EMBODIMENTS

Hereinafter, preferred embodiments of the present invention will be described with reference to the accompanying drawings. In descriptions here and the drawings, a same reference sign is assigned to constituent elements having substantially the same functional configuration, and duplicate description thereof is omitted.

A "preferred embodiment of the present invention" will be described in the following order.

1. Object of This Embodiment
2. Functional Configuration of Sound Processing Device
3. Operation of Sound Processing Device
4. Examples 4-1. First Example 4-2. Second Example

1. OBJECT OF THIS EMBODIMENT

Figure 1:
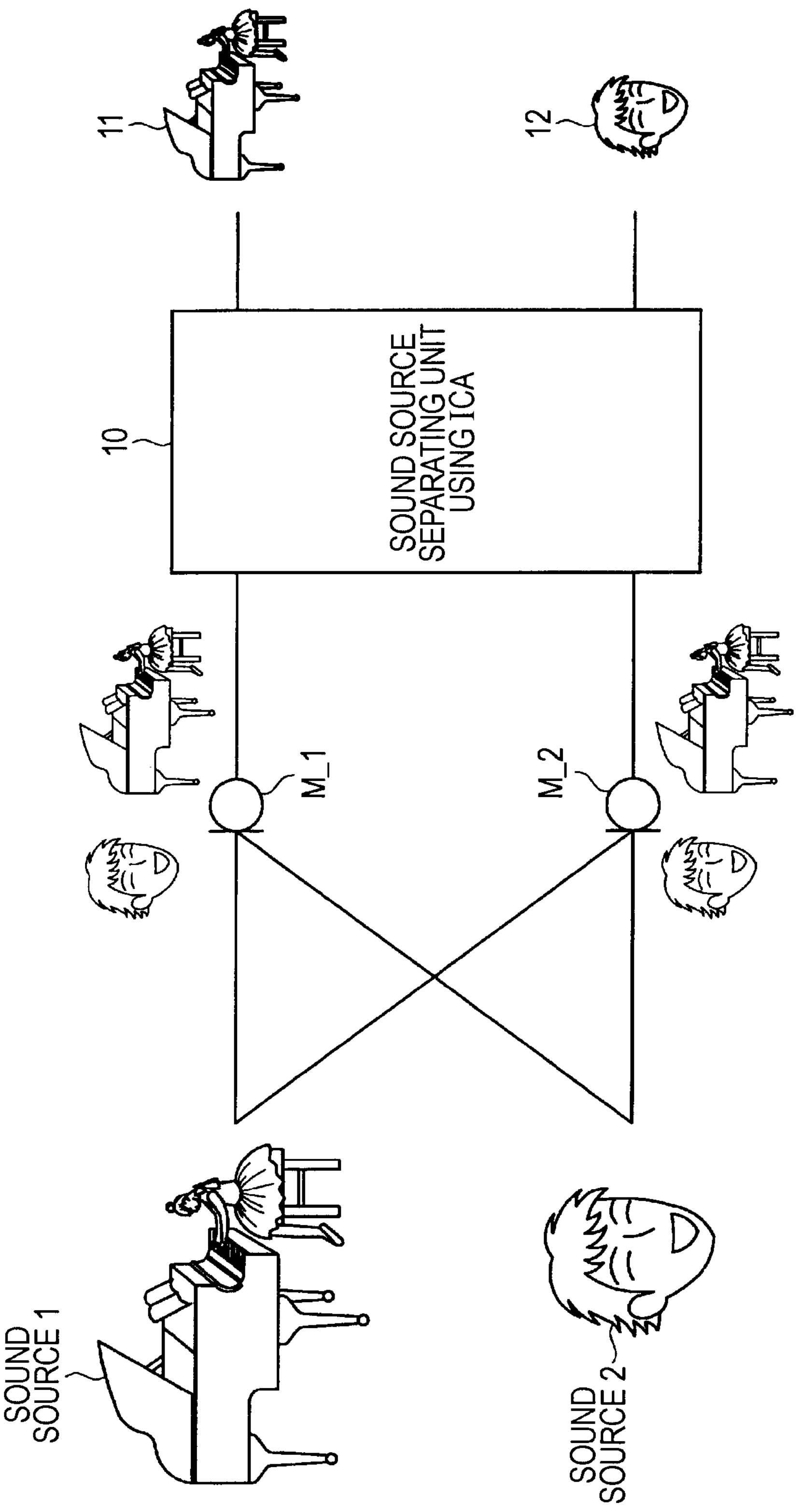
FIG. 1 is a schematic diagram illustrating a sound separation process using ICA.
Figure 2:
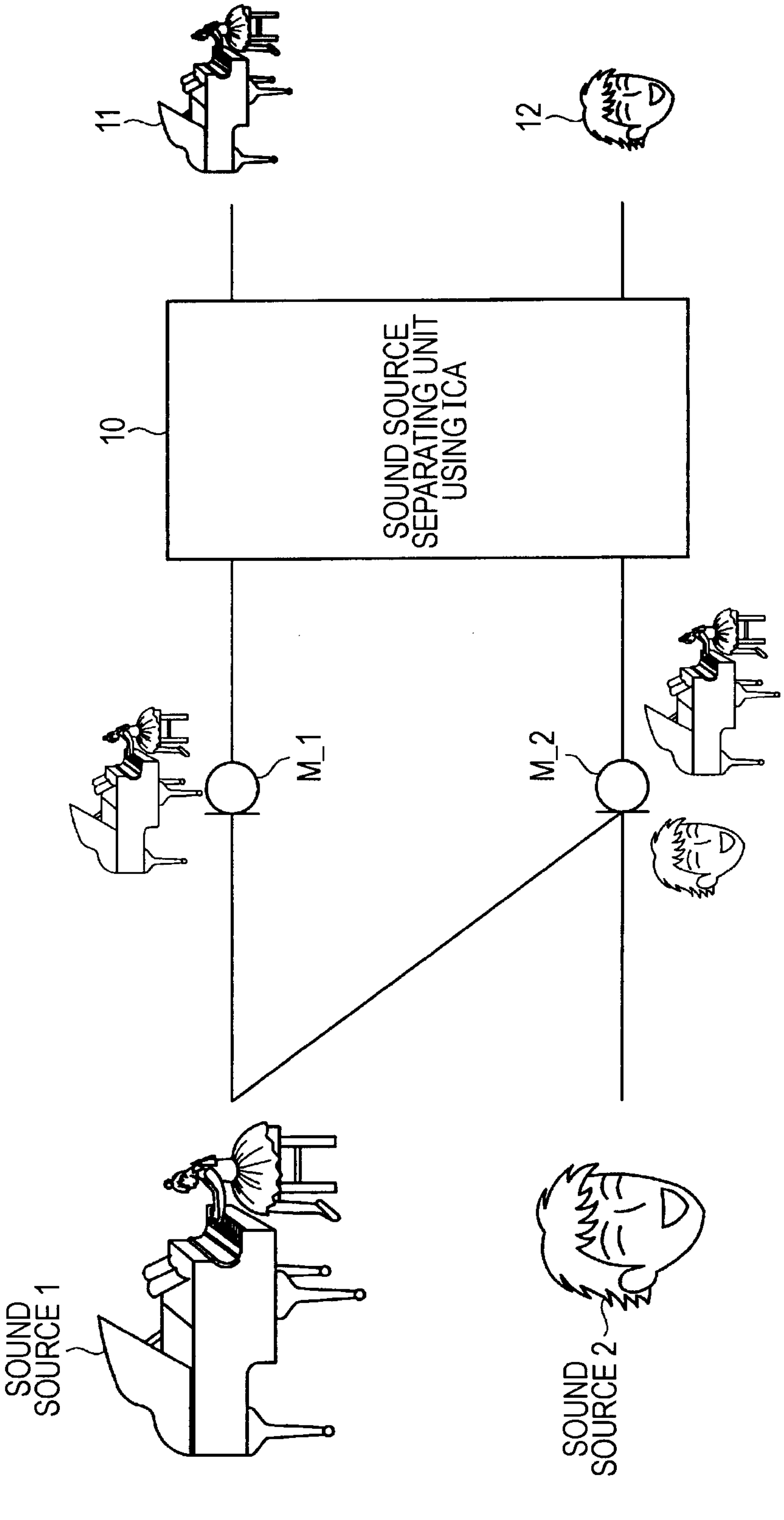
FIG. 2 is a schematic diagram illustrating a sound separation process using ICA.

First, the object of an embodiment of the present invention will be described. Recently, there is a technology of separating signals, which originate from one or more sound sources, from among mixed sounds including sounds originating from a plurality of sound sources by using a BBS (Blind Source Separation) method that is based on an ICA (Independent Component Analysis) method. FIGS. 1 and 2 are schematic diagrams illustrating a sound source separating process by using the ICA. For example, as shown in FIG. 1, a sound source 1 that is a piano sound and a sound source 2 that is a person's sound as independent sound sources are observed to be mixed together through a microphone M_1 and a microphone M_2. Then, by a sound source separating unit 10, which is included in a sound processing device, using the ICA, the mixed signals are separated from each other based on the statistical independence of the signals or paths from the sound sources to the microphones. Accordingly, an original sound source 11 and an original sound source 12 that are independent from each other are restored.

Next, a case where the numbers of observed sound sources for the microphones are different will be described. For example, as shown in FIG. 2, it is assumed that a sound source 1 is observed by the microphone M_1 and the microphone M_2, and a sound source 2 is observed by only the microphone M_2. Also in such a case, an independent signal is observed by at least one or more microphones. Accordingly, an original sound source 11 and an original sound source 12 can be restored. In particular, the sound source separating unit 10 that uses the ICA performs a process of extracting the component of the sound source 1 from the microphone M_2 by using information observed by the microphone M_1.

Figure 3:
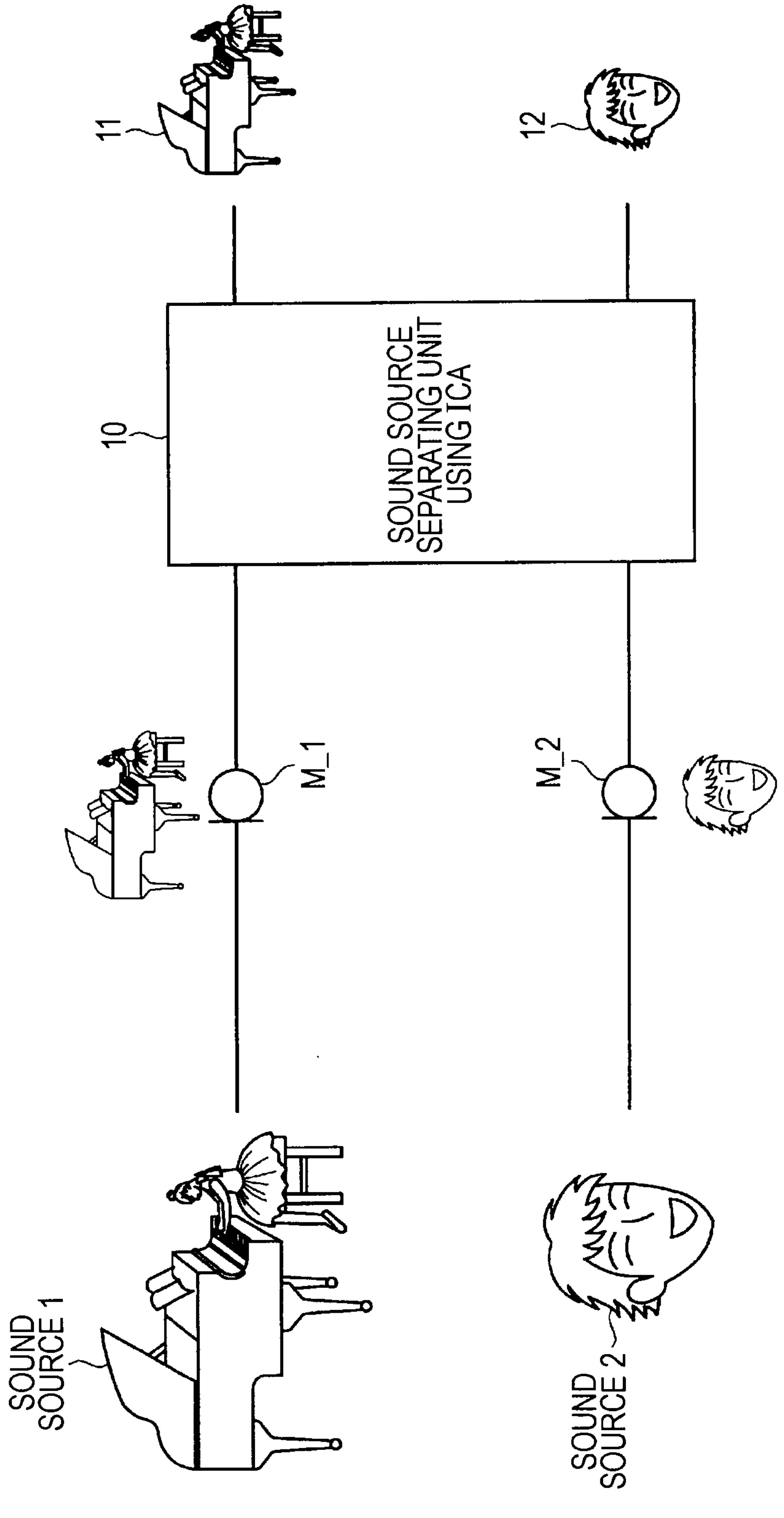
FIG. 3 is a schematic diagram illustrating a sound separation process using ICA.

In addition, as shown in FIG. 3, in a case where only independent sound sources are observed at the microphone M_1 and the microphone M_2, each independent sound source can be acquired without separating any signal. In other words, in a case where only a sound source 1 is observed by the microphone M_1, and only a sound source 2 is observed by the microphone M_2, an original sound source 11 and an original sound source 12 are restored without separating any signal. The reason for this is that the sound source separating unit 10 using the ICA is operated so as to output signals having high independency.

As described above, in a case where an observed signal has high independency, it can be known that the sound source separating unit 10 using the ICA tends to directly output the observed signal. Thus, by selecting a specific signal from among signals input to the sound source separating unit 10, the operation of the sound source separating unit 10 can be controlled.

Figure 4:
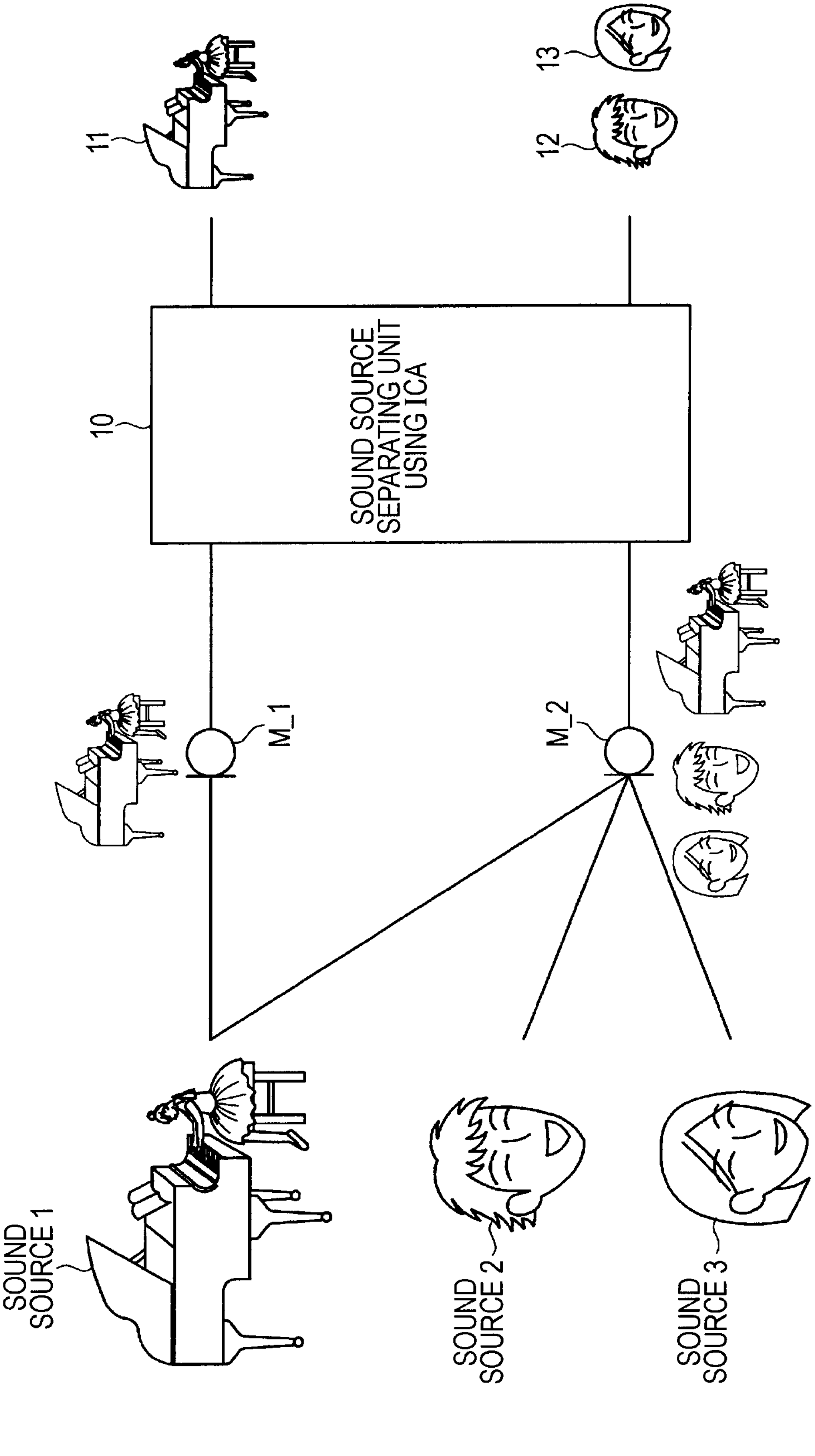
FIG. 4 is a schematic diagram illustrating the use of a sound source separating unit according to this embodiment.

Next, the use of the sound source separating unit 10 according to this embodiment will be described with reference to FIG. 4. FIG. 4 is a schematic diagram illustrating the use of the sound source separating unit according to this embodiment. As shown in FIG. 4, it is assumed that only a sound source 1 out of sound sources 1, 2, and 3 is observed by the microphone M_1. On the other hand, the sound sources 1 to 3 are observed by the microphone M_2. The three sound sources observed by the microphone M_2 are originally independent sound sources. However, since the number of microphones is smaller than the number of sound sources, a condition for separating the sound source 2 and the sound source 3 by using the sound source separating unit 10 using the ICA is not sufficient. Accordingly, it is difficult to separate the sound sources. In other words, since the sound source 2 and the sound source 3 are not observed by only one channel, it is difficult to evaluate the independency of the sound source 2 and the sound source 3. The reason for this is that separation of sound sources are achieved by increasing the independency of separated signals by using a plurality of observed signals in the sound source separating unit 10 using the ICA.

On the other hand, the sound source 1 is also observed by the microphone M_1. Accordingly, it is possible to suppress the sound source 1 from the microphone M_2. In such a case, it is preferable that the sound source 1 is a dominant sound source, for example, having a loud sound relative to the sound sources 2 and 3. Accordingly, the sound separating unit 10 operates to eliminate the component of the sound source 1 from the microphone M_2 with the sound source 2 and the sound source 3 used as a pair. In this embodiment, the characteristic of the sound source separating unit 10 that, among a plurality of signals, a signal having high independency is directly output and the signal having high independency is eliminated from other signals so as to be output is used.

In addition, in order to decrease remaining noise that is not eliminated by the above-described sound source separation using the ICA, a technology of using a nonlinear process after the sound source separation using the ICA is disclosed. However, performance of the nonlinear process after the ICA process is on the premise that the separation using the ICA is operated well at the former stage. Accordingly, there is a problem in that sufficient improvement of performance is not expected by adding the nonlinear process at the latter stage in a case where the sound separation is not achieved to some degree in the separation process using the ICA.

Thus, a technology of performing a nonlinear process at a stage prior to the sound source separation using the ICA is disclosed. According to such a technology, even in a case where the number N of sound sources and the number M of sensors are in the relationship of N>M, mixed signals can be separated with high quality. In order to extract each signal with high precision in the sound source separation using the ICA, it is necessary that M≥N. Thus, in Japanese Patent No. 3,949,150, it is assumed that N sound sources do not simultaneously exist, and a time-frequency component that only includes V (V≤M) sound sources is extracted from an observed signal, in which N sound sources are mixed, by using binary masking or the like. Then, each sound source can be extracted from the limited time-frequency component by applying the ICA or the like.

Figure 5:
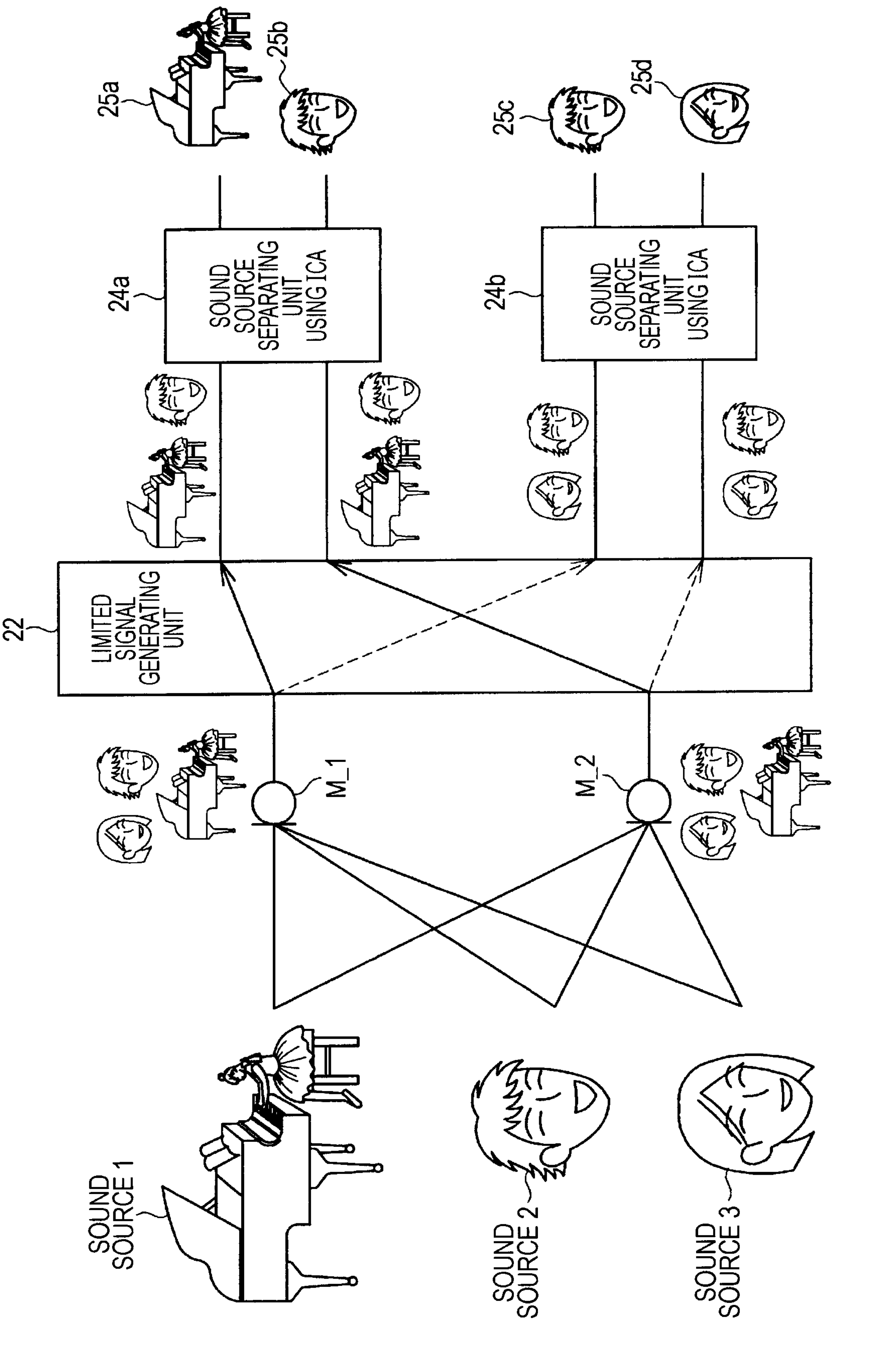
FIG. 5 is a schematic diagram illustrating a technology of performing a nonlinear process at a stage prior to sound source separation using the ICA.

FIG. 5 is a schematic diagram illustrating a technology of performing a nonlinear process at a stage prior to the sound source separation using the ICA. In FIG. 5, in a case where the number N of sound sources is three and the number M of microphones is two, in order to separate the signals with high precision, a binary mask processing or the like is performed for an observed signal as a nonlinear process. In the binary mask processing performed by a limited signal generating unit 22, a component that only includes V (≤M) sound sources is extracted from a signal including N sound sources. Accordingly, a state in which the number of the sound sources is the same as or smaller than the number of the microphones can be formed.

As shown in FIG. 5, the limited signal generating unit 22 extracts a time-frequency component that includes only the source 1 and the source 2 and a time-frequency component that includes only the sound source 2 and the sound source 3 from time-frequency components of observed signals that are observed by the microphone M_1 and the microphone M_2. Then, for a time-frequency component satisfying the condition of "the number of sound sources=the number of microphones", the sound source separation using the ICA is performed. Accordingly, a sound source 25*a* that is acquired by restoring the sound source 1 and a sound source 25*b* that is acquired by restoring the sound source 2 are separated by a sound source separating unit 24*a*. In addition, a sound source 25*c* that is acquired by restoring the sound source 2 and a sound source 25*d* that is acquired by restoring the sound source 3 are separated by a sound source separating unit 24*b*.

In the above-described technology, the condition of 2≤V≤M is configured, and then each sound source can be extracted. However, there is a problem in that necessary signals are mixed after extraction of individual sound sources even in a case where only a signal originating from one sound source is desired to be eliminated from the mixed signal.

Thus, in consideration of the above-described situations, a sound processing device 100 according to this embodiment is contrived. According to the sound processing device 100 of this embodiment, a signal including a sound source having high independency can be effectively eliminated from a mixed signal.

Here, an overview of the sound processing device 100 according to an embodiment of the present invention will be described with reference to FIG. 6.

Figure 6:
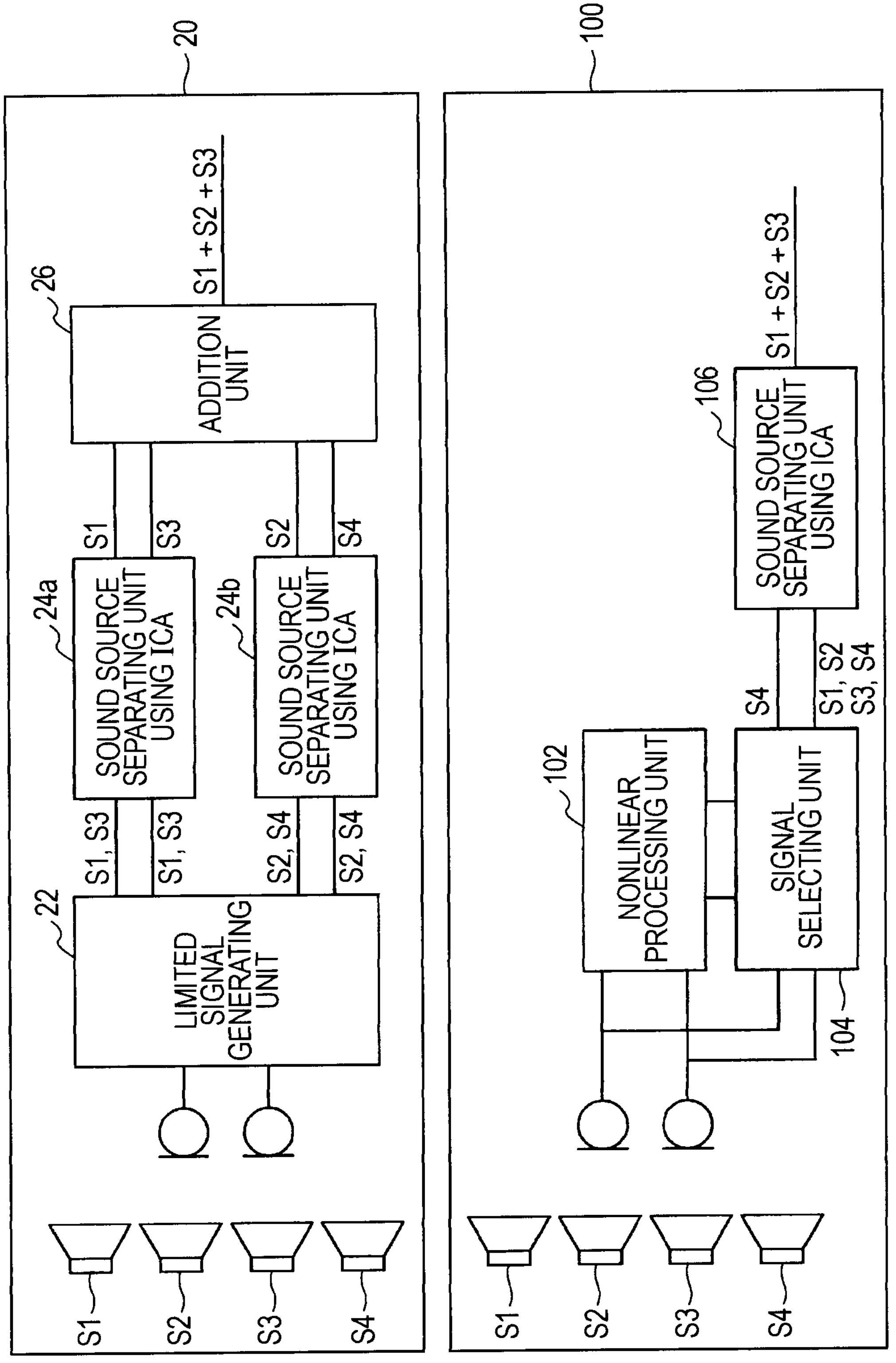
FIG. 6 is a schematic diagram illustrating an overview of a sound processing device according to an embodiment of the present invention.

FIG. 6 is a schematic diagram illustrating a difference between the technology according to an embodiment of the present invention and a technology represented in FIG. 5. Hereinafter, a case where N sound sources (N=4 (S1, S2, S3, and S4)) are observed by M (M=2) microphones, and a signal including the sound sources S1, S2, and S3 is obtained will be described.

As shown in FIG. 6, in the sound processing device 20 shown in FIG. 5, mixed sounds including sound sources corresponding to the number of the microphones are extracted by the limited signal generating unit 22, and separated signals of each sound source are output by the sound source separating unit 24*a* and the sound source separating unit 24*b*. Then, in order to acquire a signal that includes the sound sources S1, S2, and S3, the signals of the sound sources S1, S2, and S3 among the signals separated for each sound source are added together, whereby a signal that does not include only the sound source S4 can be acquired.

On the other hand, in the sound processing device 100 according to an embodiment of the present invention, the signal of the sound source S4 is extracted in a simplified manner by the nonlinear processing unit 102, and the signal including only the sound source S4 and the observed signal S1 to S4 are input to a sound source separating unit. The sound source separating unit 106 to which the selected input signal is input recognizes S4 and S1 to S4 as two independent sound sources and outputs a signal (S1+S2+S3) acquired by eliminating S4 from the observed signal including S1 to S4.

As described above, in the sound processing device 20, in order to acquire a sound signal that includes S1 to S3, a sound source separating process is performed twice, and then a process of mixing necessary sound signals is performed. However, according to an embodiment of the present invention, by acquiring one signal S4 having high independency through a nonlinear process, it is possible to acquire a desired sound signal including S1 to S3 by performing a sound source separating process once.

2. FUNCTIONAL CONFIGURATION OF SOUND PROCESSING DEVICE

Figure 7:
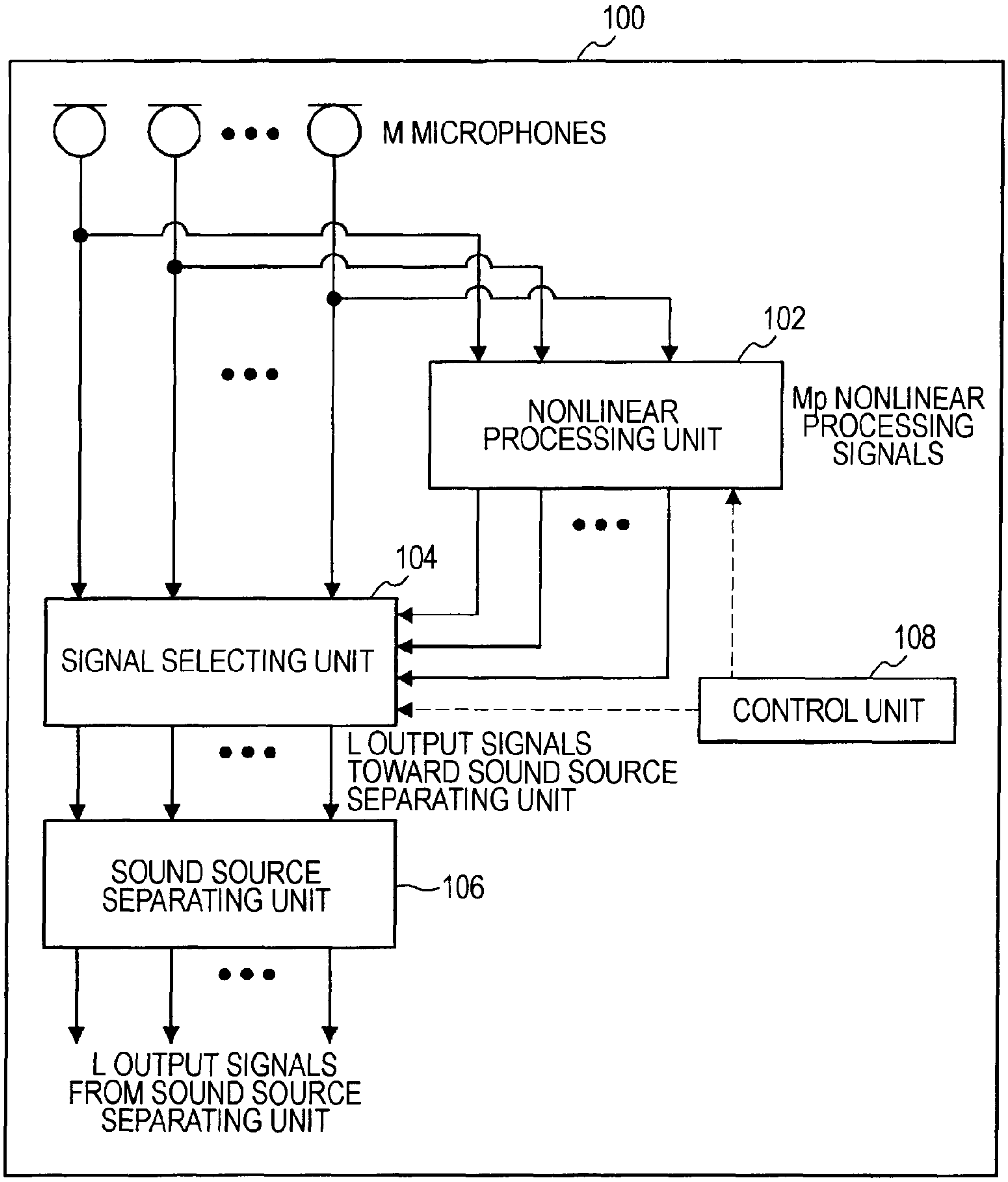
FIG. 7 is a block diagram showing the functional configuration of a sound processing device according to an embodiment of the present invention.

Next, a functional configuration of the sound processing device 100 according to this embodiment will be described with reference to FIG. 7. As shown in FIG. 7, the sound processing device 100 includes a nonlinear processing unit 102, a signal selecting unit 104, a sound source separating unit 106, and a control unit 108. The nonlinear processing unit 102, the signal selecting unit 104, and the sound source separating unit 106, and the control unit 108 are configured by a computer. Thus, the operations of the above-described units are performed by a CPU based on a program stored in a ROM (Read Only Memory) included in the computer.

The nonlinear processing unit 102 has a function of outputting a plurality of sound signals that exist in a predetermined area by performing a non-linear process for a plurality of observed signals that are generated from a plurality of sound sources and are observed by a plurality of sensors under a direction of the control unit 108. In this embodiment, the plurality of sensors, for example, are microphones. In addition, hereinafter, the number M of the microphones is assumed to be two or more. The non-linear processing unit 102 performs a nonlinear process for the observed signals that are observed by M microphones and outputs Mp sound signals.

The nonlinear processing unit 102 can extract a specific signal by assuming that it is rare that the observed signals observed by a plurality of sensors simultaneously have a same time-frequency component in a case where there are a plurality of sound sources. In this embodiment, a specific sound source having high independency is assumed to be included in the plurality of sound sources observed by the plurality of sensors. In such a case, the nonlinear processing unit 102 can output a sound signal that includes only the specific sound source having high independency through a nonlinear process. The nonlinear process performed by the nonlinear processing unit 102 will be described in detail in the description of the first example. The nonlinear processing unit 102 supplies the output sound signal to the signal selecting unit 104.

The signal selecting unit 104 has a function of selecting a sound signal including the specific sound source and an observed signal including a plurality of sound sources observed by the microphones from among the sound signals output from the nonlinear processing unit 102 under a direction of the control unit 108. As described above, when the sound signal representing a sound component of the specific sound source having high independency is supplied by the nonlinear processing unit 102, the signal selecting unit 104 selects observed signals that include the specific sound source and sound sources other than the specific sound source from among the sound signals representing the sound component of the specific sound source output by the nonlinear processing unit 102 and the plurality of observed signals observed by the microphones. The signal selecting process performed by the signal selecting unit 104 will be described in detail later. The signal selecting unit 104 supplies the sound signal and the observed signal that have been selected to the sound source separating unit 106.

The sound source separating unit 106 has a function of separating a sound signal, which includes the specific sound source selected by the signal selecting unit 104, from among the observed signals selected by the signal selecting unit 104. The sound source separating unit 106 performs a sound source separating process by using the ICA so as to increase the independency. Accordingly, in a case where a sound signal representing the sound component of the specific sound source having high independency and observed signals including the specific sound source and sound sources other than the specific sound source are input to the sound source separating unit 106, the sound source separating unit 106 performs a process of separating the sound component of the specific sound source from the observed signals including the specific sound source and sound sources other than the specific sound source. In the sound source separating process using the ICA, when L input signals are input to the sound source separating unit, L output signals, which is the same as that of the input signals, having high independency are output.

3. OPERATION OF SOUND PROCESSING DEVICE

Figure 8:
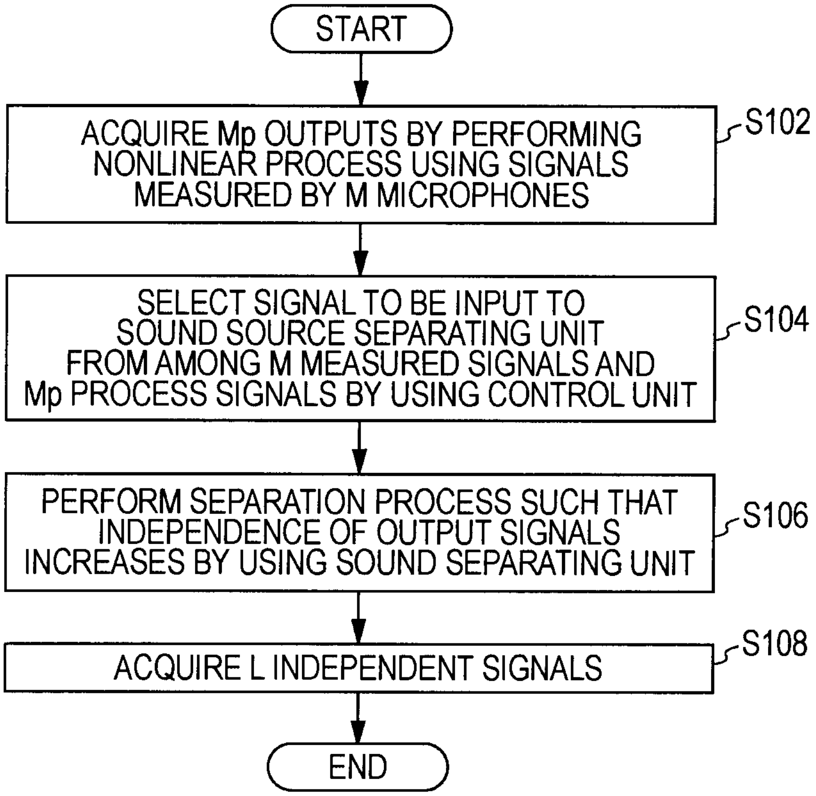
FIG. 8 is a flowchart representing a sound processing method according to the embodiment.

As above, the functional configuration of the sound processing device 100 has been described. Next, the operation of the sound processing device 100 will be described with reference to FIG. 8. FIG. 8 is a flowchart representing the sound processing method of the sound processing device 100. As represented in FIG. 8, first, the nonlinear processing unit 102 performs a nonlinear process by using signals observed by M microphone and outputs Mp sound signals (S102). The signal selecting unit 104 selects L signals to be input to the sound source separating unit 106 from among the M observed signals observed by the M microphones and the Mp sound signals output by the nonlinear processing unit 102 (S104).

Then, the sound separating unit 106 performs a sound source separating process so as to increase the independency of the output signals output from the sound separating unit 106 (S106). Then, the sound source separating unit 106 outputs L independent signals (S108). As above, the operation of the sound processing device 100 has been described.

4. EXAMPLES

Next, examples in which the sound processing device 100 is used will be described. Hereinafter, the number of sound sources will be described as N, and the number of microphones will be described as M. In the first example, a case where the number of the sound sources and the number of the microphones are the same (N=M) will be described. In particular, a case where the number of the sound sources and the number of the microphones are three will be described. In addition, in the second example, a case (N>M) where the number of the sound sources is greater than the number of the microphones will be described. In particular, a case where the number of the sound sources is three, and the number of the microphones is two will be described.

4-1. First Example

Figure 9:
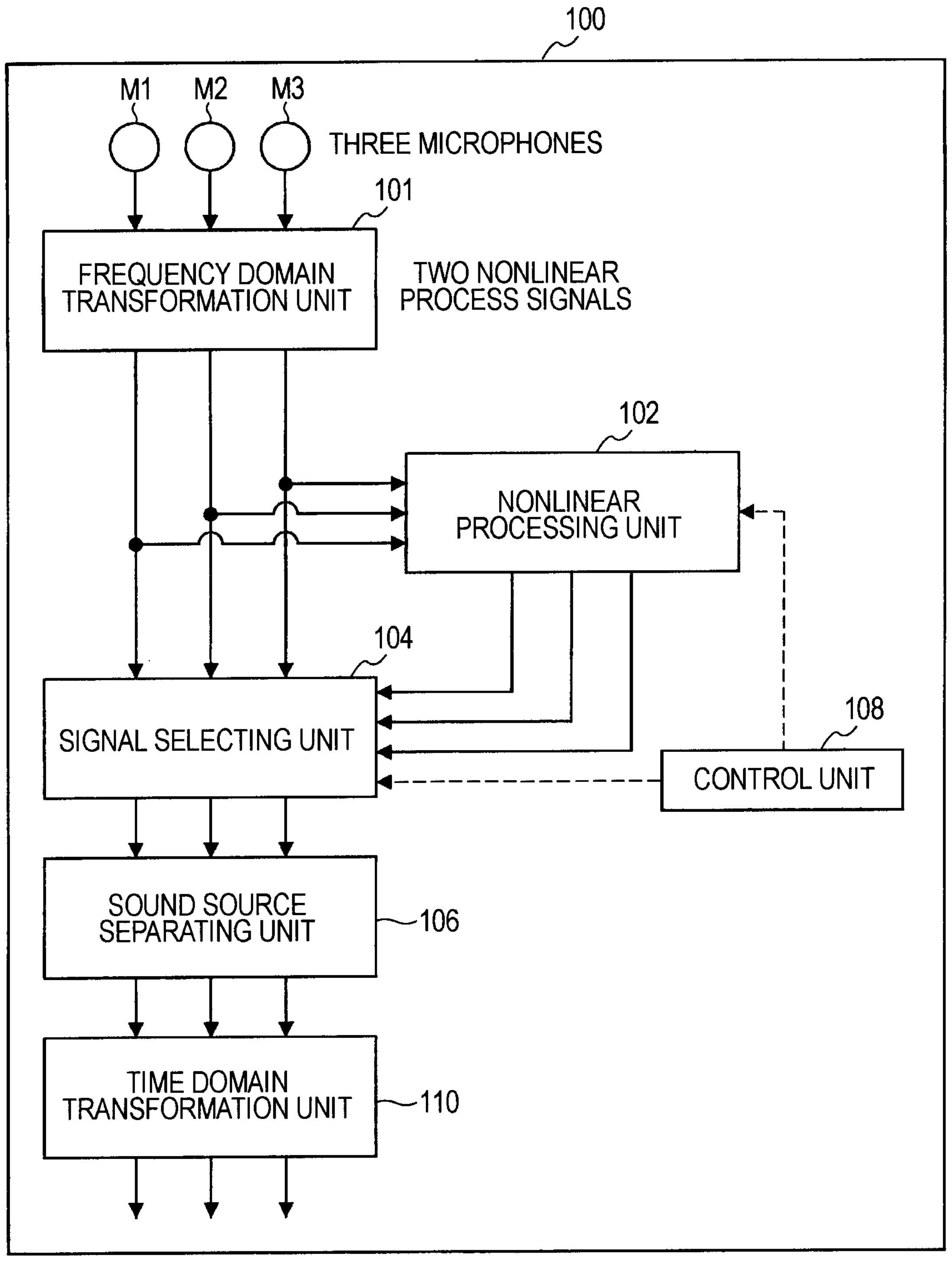
FIG. 9 is a block diagram showing the configuration of a sound processing device according to a first example.

First, the configuration of a sound processing device 100*a* according to the first example will be described with reference to FIG. 9. The basic configuration of the sound processing device 100*a* is the same as that of the above-described sound processing device 100. Thus, in the description of the sound processing device 100*a*, a more detailed configuration of the sound processing device 100 is shown. As shown in FIG. 9, the sound processing device 100*a* includes a frequency domain converting unit 101, a nonlinear processing unit 102, a signal selecting unit 104, a sound source separating unit 106, a control unit 108, and a time domain converting unit 110.

The frequency domain converting unit 101 has a function of converting a plurality of observed signals that are generated by a plurality of sound sources and are observed by a plurality of microphones into signal values of the frequency domain. The frequency domain converting unit 101 supplies the converted observed signal values to the nonlinear processing unit 102. In addition, the time domain converting unit 110 has a function of performing a time domain conversion such as a short time inverse Fourier transform for the output signals output by the sound source separating unit 106 and outputting time waveforms.

Figure 10:
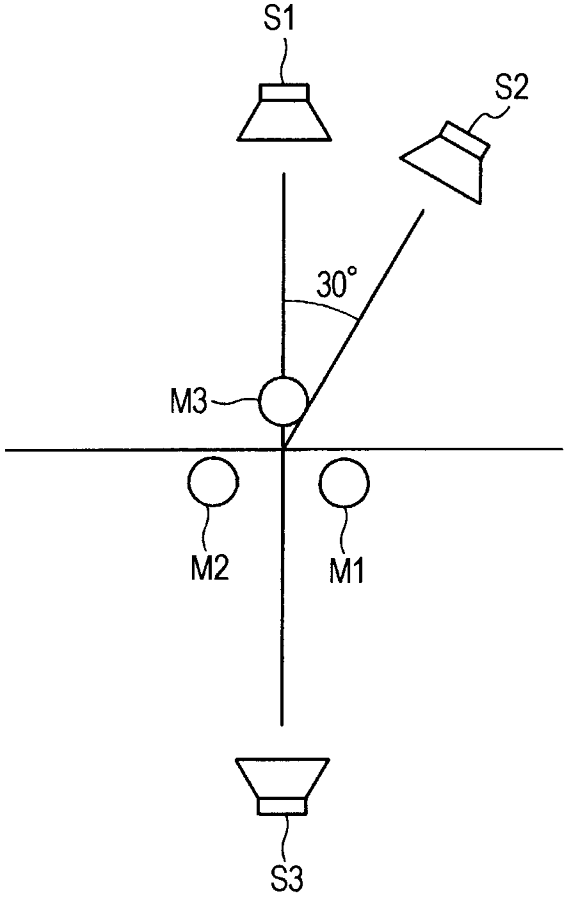
FIG. 10 is a schematic diagram illustrating the positional relationship between microphones and sound sources according to the example.

In addition, in the first example, the three microphones M1 to M3 and the three sound sources S1 to S3 are described to be in the positional relationship shown in FIG. 10. In the first example, the sound source S3 is a dominant sound source that is louder than the other sound sources S1 and S2 or the like. In addition, even in a case where the sound source has directivity for the microphones, the sound source S3 is observed by the microphones as a dominant sound source relative to the other sound sources. Here, having directivity, for example, is a case where the front side of a speaker is appropriate for a microphone in a case where the sound source is the speaker. On the other hand, in a case where the sound source is a human voice, having directivity sound is a case where a person speaks toward the microphone. The object of the sound processing device 100*a* is to eliminate the sound signal of the sound source S3, which is the specific sound source, from the sound signals including the sound sources S1 to S3.

Figure 11:
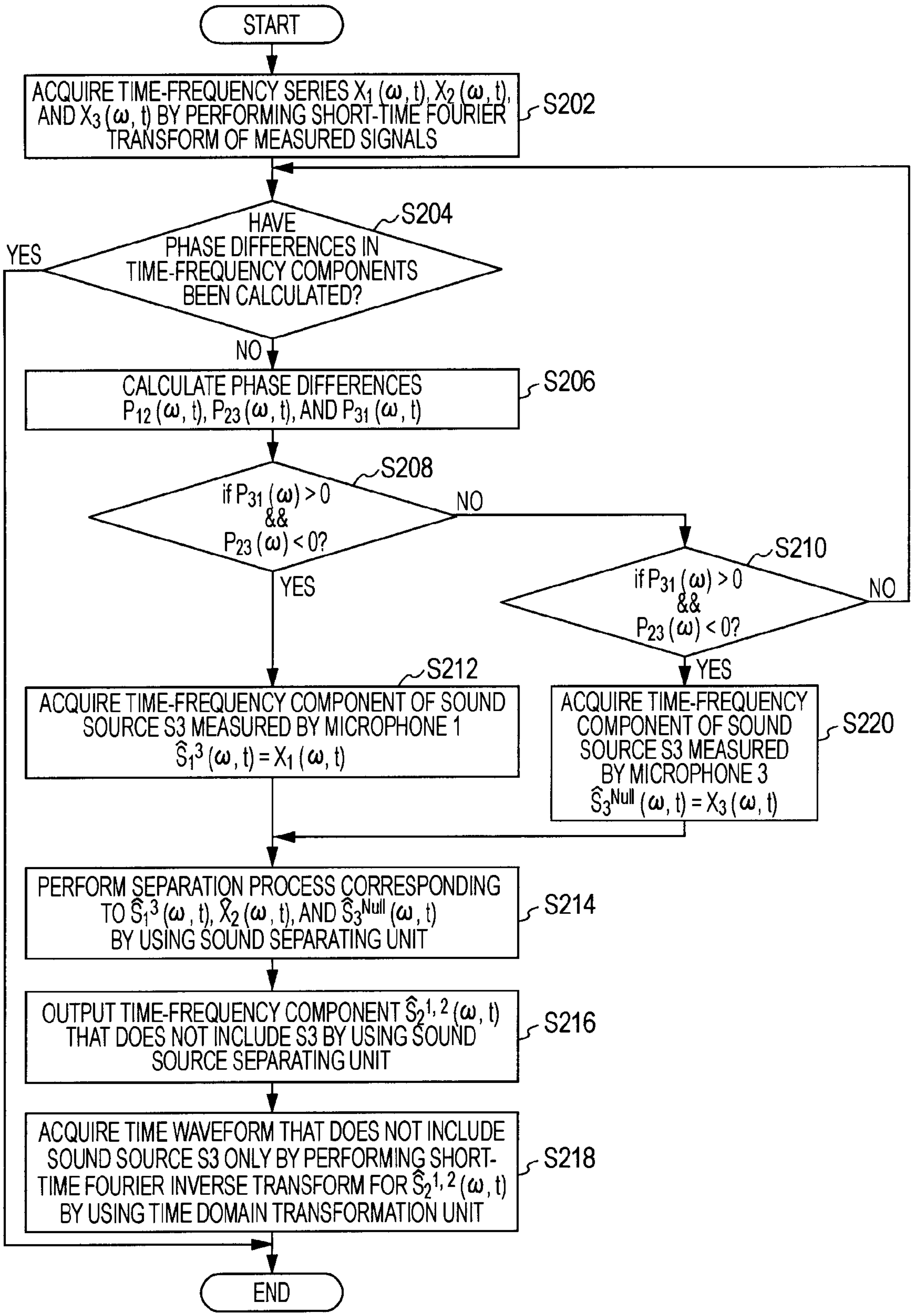
FIG. 11 is a flowchart representing a sound processing method according to the example.

Next, the sound processing method of the sound processing device 100*a* will be described with reference to FIG. 11. First, the frequency domain converting unit 101 acquires the following time-frequency series by performing a short-time Fourier transform for observed signals observed by the microphones (S202).

$$X_1(\omega,t), X_2(\omega,t), X_3(\omega,t) \qquad \text{Numeric Expression 1}$$

Next, it is determined whether or not the phase differences of the time-frequency components acquired in Step S202 have been calculated (S204). In a case where the phase differences of the time-frequency components are determined not to have been calculated in Step S204, the process of Step S206 is performed. On the other hand, in a case where the phase differences of the time-frequency components are determined to have been calculated in Step S204, the process ends.

In the case where the phase differences of the time-frequency components are determined to have been calculated in Step S204, the following phase differences of the time-frequency components acquired in Step S202 are calculated.

$$P_{12}(\omega,t), P_{23}(\omega,t), P_{31}(\omega,t) \qquad \text{Numeric Expression 2}$$

The phase differences of the microphone pairs will be described later in detail. Next, it is determined whether or not the phase differences of the microphone pairs satisfy the following Conditional Expression 1 (S208).

Numeric Expression 3

$$\text{if } P_{31}(\omega)>0 \;\&\&\; P_{23}(\omega)<0 \qquad \text{Conditional Expression 1}$$

In a case where the phase differences of the microphone pairs are determined to satisfy Conditional Expression 1 in Step S208, the time-frequency component of the sound source S3 that is measured by the microphone 1 is acquired in the following Numeric Expression (S212).

$$\hat{S}_i^3(\omega,t)=X_1(\omega,t) \qquad \text{Numeric Expression 4}$$

Here, the time-frequency component that includes only a sound source j observed by a microphone i is denoted by the following numeric expression.

$$\hat{S}_i^j(\omega,t) \qquad \text{Numeric Expression 5}$$

In this example, the positional relationship between the sound sources and the microphones that is as shown in FIG. 10 is formed, and thus the sound source S3 is a sound source having high independency. Accordingly, the time-frequency component (sound signal) of only the sound source 3 can be acquired by performing a nonlinear process for the observed signal observed by the microphone 1 in Step S212. On the other hand, in a case where the phase differences of the microphone pairs in Step S208 are determined not to satisfy Conditional Expression 1 in Step S208, it is determined whether or not the phase differences of the microphone pairs satisfy the following Conditional Expression 2 (Step S210).

Numeric Expression 6

$$\text{if } P_{31}(\omega)<0 \;\&\&\; P_{23}(\omega)<0 \qquad \text{Conditional Expression 2}$$

In a case where the phase differences of the microphone pairs are determined to satisfy Conditional Expression 2 in Step S210, a time-frequency component that includes only a reverberation component not including major sound sources such as the sound sources S1, S2, and S3, observed by a microphone 3, is acquired in the following numeric expression (S220).

$$\hat{S}_3^{Null}(\omega,t)=X_3(\omega,t) \quad \text{Numeric Expression 7}$$

Here, the time-frequency that does not include major sound sources is denoted by the following numeric expression.

$$\hat{S}_i^{Null}(\omega,t) \quad \text{Numeric Expression 8}$$

In Step S220, the time-frequency component (sound signal) of the reverberation component that does not include the major sound sources can be acquired by performing a nonlinear process for the observed signal observed by the microphone 3. Then, the sound source separating unit 106 performs a separation process for the following component (Step S214).

$$\hat{S}_3^{Null}(\omega,t)=X_3(\omega,t) \quad \text{Numeric Expression 9}$$

By performing the above-described nonlinear process, a sound signal that includes only the sound source S3 observed by the microphone 1 and a sound signal that does not include the major sound sources are acquired. Thus, the signal selecting unit 104 selects three signals of the sound signal that is output by the nonlinear processing unit 102 and includes only the sound source S3 observed by the microphone 1, the sound signal that does not include the major sound sources, and the observed signal observed by the microphone 2 and inputs the three selected signals to the sound source separating unit 106. Then, the sound separating unit 106 outputs the following time-frequency component that does not include the sound source S3 (S216).

$$\hat{S}_2^{1,2}(\omega,t) \quad \text{Numeric Expression 10}$$

Then, the time domain converting unit 110 acquires a time waveform that does not include only the sound source 3 by performing a short-time inverse Fourier transform for the above-described time-frequency component that does not include the sound source S3 (S218).

The sound source separating unit 106 to which the three signals of the sound signal that includes only the sound source S3 observed by the microphone 1, the sound signal that does not include the major observed signals, and the observed signal that is observed by the microphone 2 are input as described above performs a sound source separating process by using the ICA so as to increase the independency of the output signal. Accordingly, the sound signal that includes only the sound source S3 having high independency is directly output. In addition, the sound source S3 is eliminated from the observed signal observed by the microphone 2 so as to be output. Then, the sound signal that does not include the major sound sources is directly output. As described above, by separating the sound signal including the sound source having high independency through the nonlinear process in a simplified manner, the sound signal that does not include only the sound source having high independency can be effectively acquired.

Figure 12:
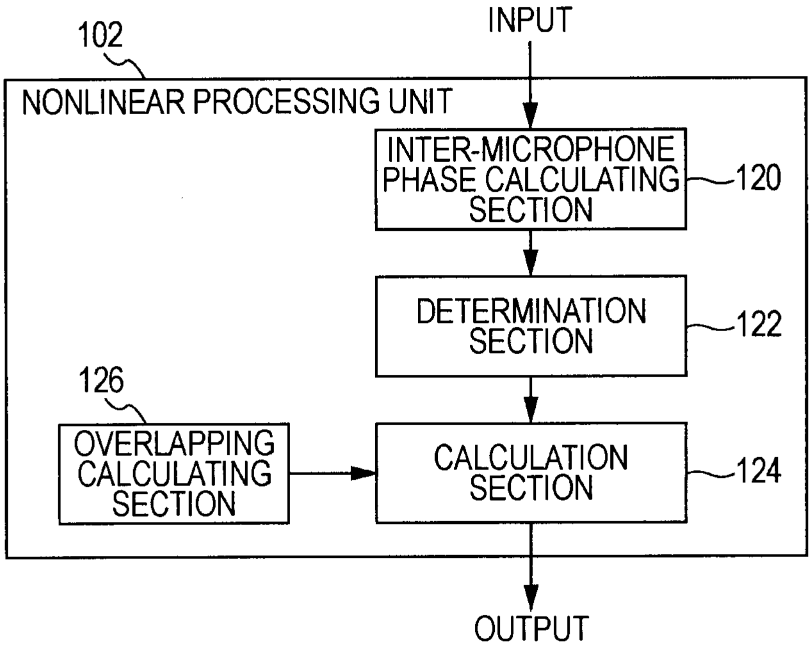
FIG. 12 is a schematic diagram illustrating a nonlinear process according to the example in detail.
Figure 13:
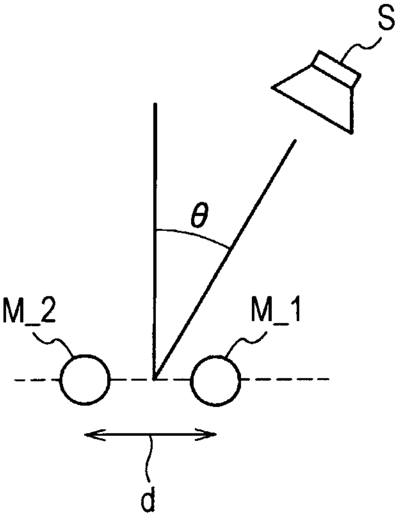
FIG. 13 is a schematic diagram illustrating the nonlinear process according to the example in detail.

Next, the nonlinear process performed by the nonlinear processing unit 102 will be described in detail with reference to FIGS. 12 to 16. As shown in FIG. 12, the nonlinear processing unit 102 includes an inter-microphone phase calculating section 120, a determination section 122, a calculating section 124, and a weight calculating section 126. To the inter-microphone phase calculating section 120 of the nonlinear processing unit 102, a Fourier transform series (frequency component) of the observed signal that is output by the frequency domain converting unit 101 and is observed by the microphone is input.

In this example, an input signal for which the short-time Fourier transform has been performed becomes the target for the nonlinear process, and the nonlinear process is performed for the observed signal of each frequency component. In the nonlinear process performed by the nonlinear processing unit 102 is on the premise that it is rare for sound sources to simultaneously have the same time-frequency component in a case where a plurality of the sound sources exist in the observed signal. Then, signal extraction is performed with each time-frequency component being weighted based on whether the frequency component satisfies a predetermined condition. For example, a time-frequency component satisfying the predetermined condition is multiplied by a weighting factor of "1". On the other hand, a time-frequency component not satisfying the predetermined condition is multiplied by a weighting factor having a value close to "0". In other words, to which sound source each time-frequency component contributes is determined by "1" or "0".

The nonlinear processing unit 102 calculates a phase difference between microphones and determines whether each time-frequency component satisfies the condition provided by the control unit 108 based on the calculated phase difference. Then, weighting is performed in accordance with the determination result. Next, the inter-microphone phase calculating section 120 will be described in detail with reference to FIG. 13. The inter-microphone phase calculating section 120 calculates phases between microphones by using each delay between the microphones.

A signal coming from a position located sufficiently far relative to the gap between the microphones will be considered. Generally, in a case where a signal coming from a far position in a direction θ is received from microphones departed from each other by a gap d shown in FIG. 13, the following delay time occurs.

$$\tau_{12} = \frac{d \cdot \sin\theta}{c} \ (c \text{ is speed of sound}) \quad \text{Numeric Expression 11}$$

Here, τ12 is an arrival delay time of the microphone M_2 with that of the microphone M_1 used as a reference and has a positive value in a case where the sound arrives first from the microphone M_1. The concurrence of the delay times depends on the arrival direction θ.

When considering each time-frequency component, the ratio between the frequency components of the microphones can be calculated for each frequency component in the following equation by using the delay between the microphones.

$$Z(\omega) = \frac{X_{M_2}(\omega)}{X_{M_1}(\omega)} = \exp(-j \cdot \omega \cdot \tau_{12}) \quad \text{Numeric Equation 12}$$

Here, XMi(ω) is a component acquired by performing a frequency conversion for a signal observed by the microphone M_i (i=1 or 2). Actually, the short-time Fourier transform is performed, and Z(ω) becomes the value of the frequency index ω.

Next, the determination section 122 will be described in detail. The determination section 122 determines whether or not each time-frequency component satisfies the condition based on a value provided by the inter-microphone phase calculating section 120. The phase of the complex number Z(ω), that is, the phase difference between the microphones can be calculated in the following equation for each time-frequency component.

$$P(\omega) = \angle Z(\omega) = \arctan\left(\frac{\mathrm{Im}(Z(\omega))}{\mathrm{Re}(Z(\omega))}\right) = -\omega \cdot \tau_{12} = -\frac{d \cdot \omega \cdot \sin\theta}{c} \quad \text{Numeric Expression 13}$$

The sign of P depends on the delay time. In other words, the sign of P depends only on θ. Accordingly, the sign of P becomes negative for a signal (sin θ>0) derived from 0<θ<180. On the other hand, the sign of P becomes positive for a signal (sin θ<0) derived from −180<θ<0.

Accordingly, in a case where the determination section 122 is notified to extract the component satisfying the condition of a signal derived from 0<θ<180 by the control unit 108, the condition is satisfied when the sign of P is positive.

Figure 14:
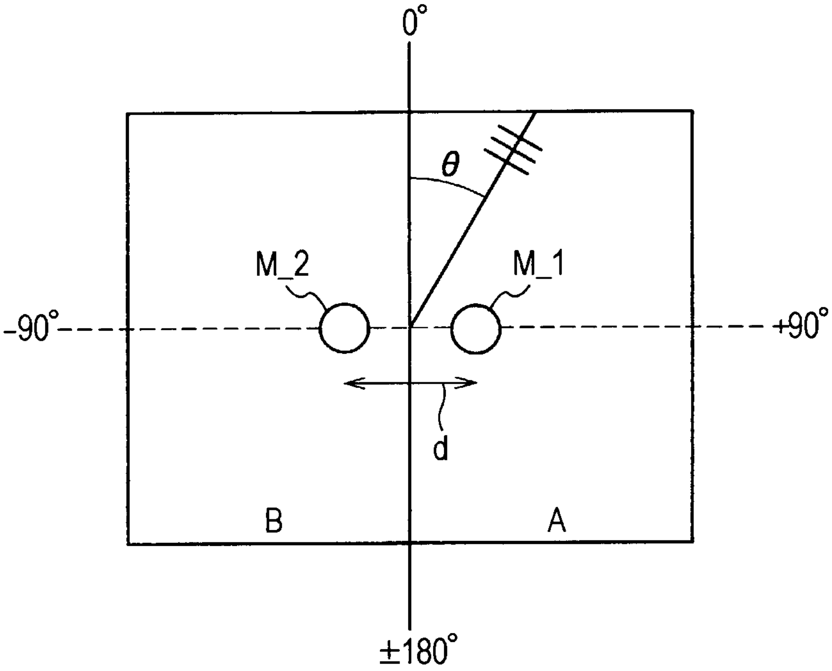
FIG. 14 is a schematic diagram illustrating the nonlinear process according to the example in detail.

The determination process performed by the determination section 122 will be described with reference to FIG. 14. FIG. 14 is a schematic diagram illustrating the determination process performed by the determination section 122. As described above, a frequency transform is performed for the observed signal by the frequency domain converting unit 101, and the phase differences between the microphones are calculated. Then, the area of each time-frequency component can be determined based on the sign of the calculated phase difference between the microphones. For example, as shown in FIG. 14, in a case where the sign of the phase difference between the microphone M_1 and the microphone M_2 is negative, it can be known that the time-frequency component originates from area A. On the other hand, in a case where the sign of the phase difference between the microphone M_1 and the microphone M_2 is positive, it can be known that the time-frequency component originates from area B.

Next, the calculation section 124 will be described in detail. The calculation section 124 applies the following weighting factors to the frequency components observed by the microphone M_1 based on the determination result of the determination section 122. The sound source spectrum originating from area A can be extracted based on the weighting factors.

$$\hat{S}^A_{M_1}(\omega) = \begin{cases} X_{M_1}(\omega) & \text{if } \mathrm{sign}(\angle P(\omega)) < 0 \\ \alpha \cdot X_{M_1}(\omega) & \text{otherwise} \end{cases} \quad \text{Numeric Expression 14}$$

Similarly, the sound source spectrum originating from area B can be extracted as follows.

$$\hat{S}^B_{M_1}(\omega) = \begin{cases} X_{M_1}(\omega) & \text{if } \mathrm{sign}(\angle P(\omega)) > 0 \\ \alpha \cdot X_{M_1}(\omega) & \text{otherwise} \end{cases} \quad \text{Numeric Expression 15}$$

$$\mathrm{sign}(x) = \begin{cases} 1 & : x > 0 \\ 0 & : x = 0 \\ -1 & : x < 0 \end{cases}$$

Here, $\hat{S}_{M_i}^{X}(\omega)$ denotes an estimated value of the sound source spectrum originating from area X observed by a Microphone M_i. In addition, α is "0" or a positive value close to "0".

Figure 15:
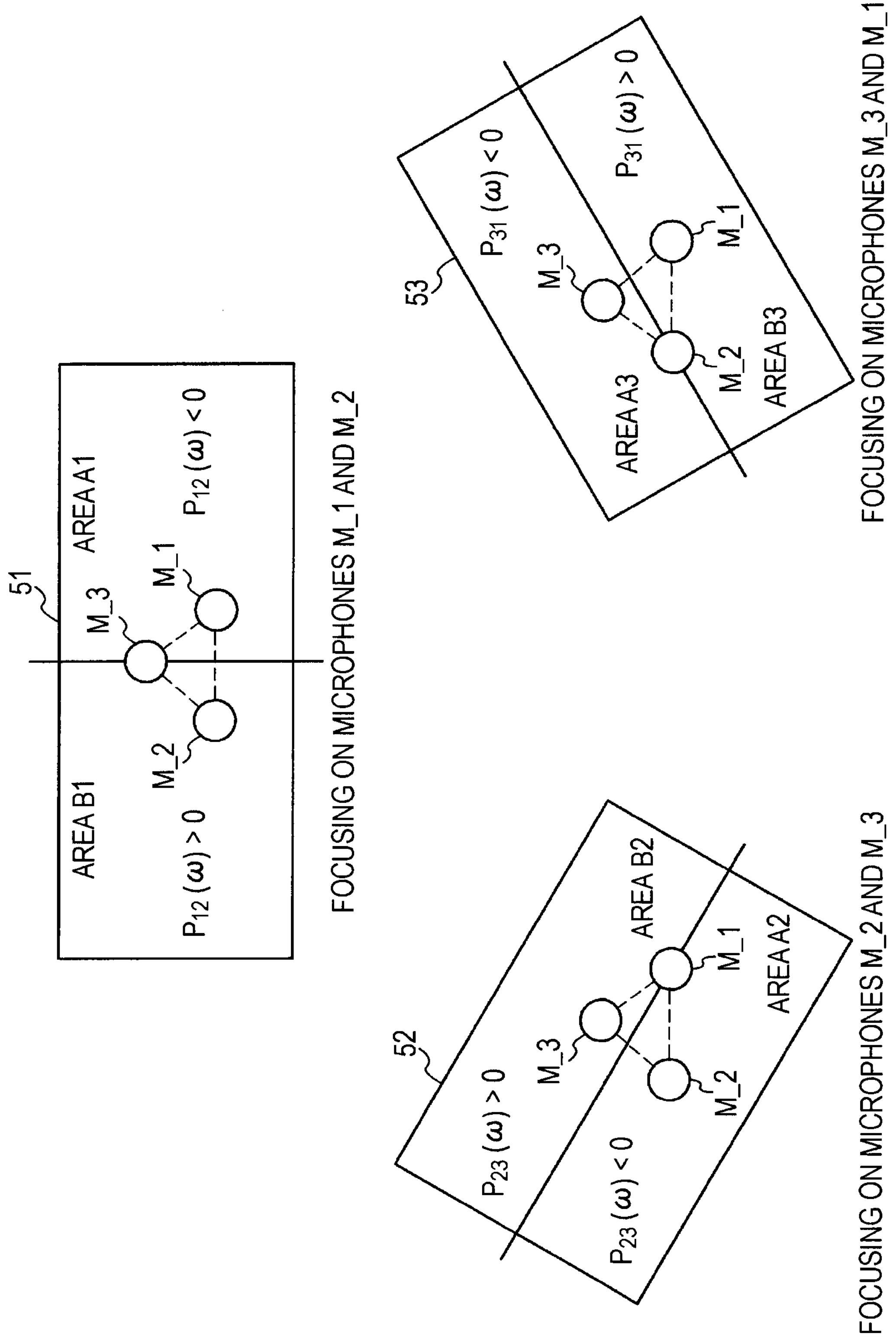
FIG. 15 is a schematic diagram illustrating the nonlinear process according to the example in detail.

Next, the phase differences for a case where the microphones M1 to M3 and the sound sources S1 to S3 are in the positional relationship shown in FIG. 10 will be described. FIG. 15 is a schematic diagram illustrating phase differences generated between each microphone pair in the first example. The phase difference generated between each microphone pair is defined as the following numeric expression.

$$P_{12}(\omega) = \angle\frac{X_{M_2}(\omega)}{X_{M_1}(\omega)} = -\omega \cdot \tau_{12} \quad \text{Numeric Expression 16}$$

$$P_{23}(\omega) = \angle\frac{X_{M_3}(\omega)}{X_{M_2}(\omega)} = -\omega \cdot \tau_{23}$$

$$P_{31}(\omega) = \angle\frac{X_{M_1}(\omega)}{X_{M_3}(\omega)} = -\omega \cdot \tau_{31}$$

As shown in FIG. 15, the area from which the frequency component originates can be determined based on the sign of the phase difference. For example, in a case where the microphones M_1 and M_2 are considered (schematic diagram 51), when the phase difference P12(ω) is negative, the frequency component can be determined to originate from area A1. On the other hand, when the phase difference P12(ω) is positive, the frequency component can be determined to originate from area B1.

Similarly, in a case where the microphones M_2 and M_3 are considered (schematic diagram 52), when the phase difference P23(ω) is negative, the frequency component can be determined to originates from area A2. On the other hand, when the phase difference P23(ω) is positive, the frequency component can be determined to originate from area B2. In addition, in a case where the microphones M_3 and M_1 are considered (schematic diagram 53), when the phase difference P31(ω) is negative, the frequency component can be determined to originate from area A3. On the other hand, when the phase difference P31(ω) is positive, the frequency component can be determined to originate from area B3. In addition, by applying the following condition, the calculation section 124 extracts the component existing in area A of the schematic diagram 55 shown in FIG. 16 by performing the process described below.

$$S^A_{M_1}(\omega) = \begin{cases} X_{M_1}(\omega) \text{ if } P_{31}(\omega) > 0 \ \&\& \ P_{23}(\omega) < 0 \\ 0 \end{cases} \quad \text{Numeric Expression 17}$$

Figure 16:
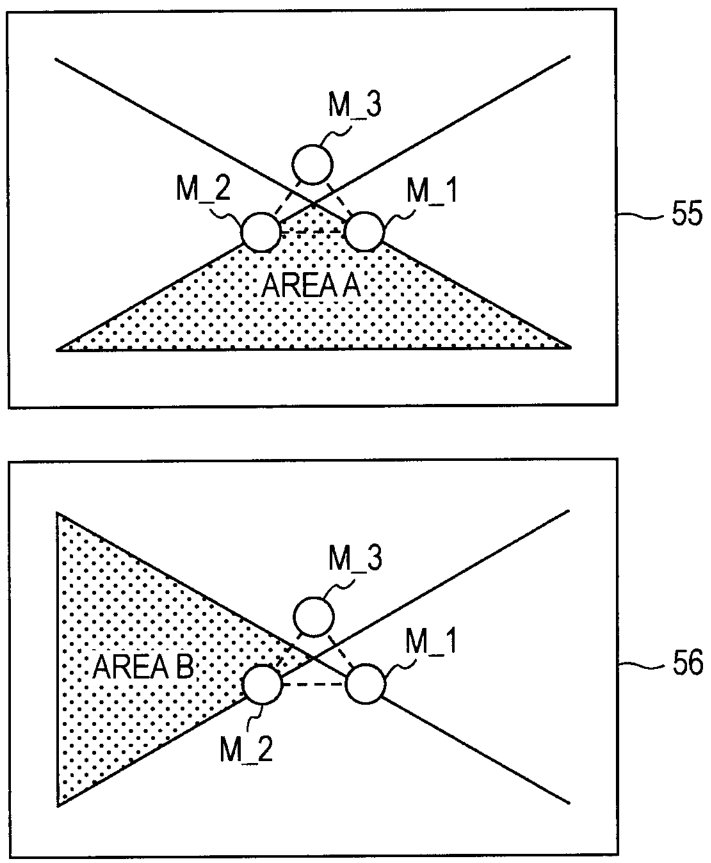
FIG. 16 is a schematic diagram illustrating the nonlinear process according to the example in detail.

Similarly, by applying the condition described below, the component existing in area B of the schematic diagram 56 shown in FIG. 16 is extracted.

$$S^B_{M_1}(\omega) = \begin{cases} X_{M_1}(\omega) \text{ if } P_{31}(\omega) < 0 \ \&\& \ P_{23}(\omega) < 0 \\ 0 \end{cases} \quad \text{Numeric Expression 18}$$

In other words, by extracting the frequency component of area A, the sound signal of the sound source S3 that originates from area A can be acquired. In addition, by extracting the frequency component of area B, the sound signal that is not related to the independency of the sound sources S1 to S3 can be extracted. Here, the sound source originating from area B is a component that does not include direct sounds of each sound source and includes weak reverberation.

Next, the process of the signal selecting unit 104 in the first example will be described in detail. The signal selecting unit 104 selects N_out (≤N_in) output signals from N_in inputs based on the control information notified from the control unit 108 in accordance with the method of separating the sound sources. To the signal selecting unit 104, the Fourier transform series (frequency component) of the observed signals provided by the frequency domain converting unit 101 and the time-frequency series provided by the nonlinear processing unit 102 are input. The signal selecting unit 104 selects a necessary signal under a direction of the control unit 108 and supplies the selected signals to the sound source separating unit 106.

The object of the first example is to acquire a signal that does not include only the sound source S3 shown in FIG. 10 under the control of the control unit 108. Accordingly, it is necessary for the signal selecting unit 104 to select signals to be input to the sound source separating unit 106. The signals to be input to the sound source separating unit 106 are at least the signal including only the sound source S3 and the signal including all the sound sources S1 to S3. In addition, since three sound sources are input to the sound source separating unit 106 in the first example, it is necessary that the signal selecting unit 104 additionally selects the signal that does not include all the sound sources S1 to S3.

The signals input to the signal selection unit 104 are the signals observed by the microphones (three) and signals originating from each area output by the nonlinear processing unit 102. The signal selecting unit 104 selects the signal originating from the area (area A shown in FIG. 16) in which only the sound source S3 exists and the signal originating from the area (area B shown in FIG. 16) in which all the sound sources S1 to S3 do not exist from among the signals output by the nonlinear processing unit 102. In addition, the signal selecting unit 104 selects a signal that includes mixed sounds of the sound sources S1 to S3 observed by the microphones.

The above-described three signals selected by the signal selecting unit 104 are input to the sound source separating unit 106. Then, the signal (a component of only the sound source S3) originating from area A, a signal (a component that does not include all the sound sources S1 to S3) originating from area B, and a signal (a signal not including the sound source 3) that does not include the components originating from areas A and B are output by the sound source separating unit 106. Accordingly, the signal that does not include the sound source S3 existing in area A as a target is acquired.

4-2. Second Example

Figure 17:
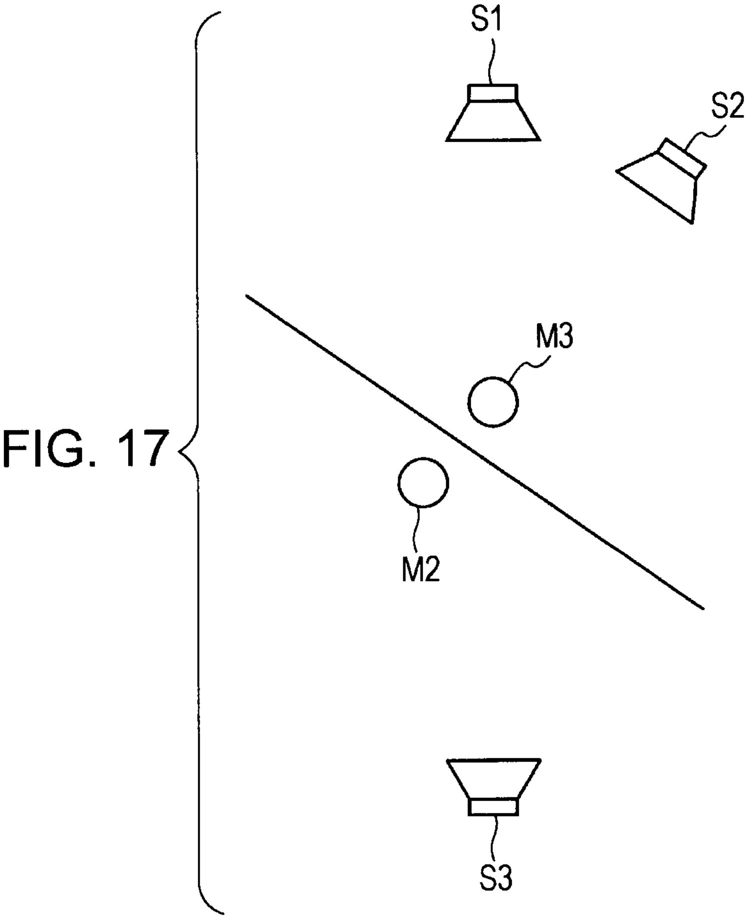
FIG. 17 is a schematic diagram illustrating the positional relationship between microphones and sound sources according to a second example.
Figure 18:
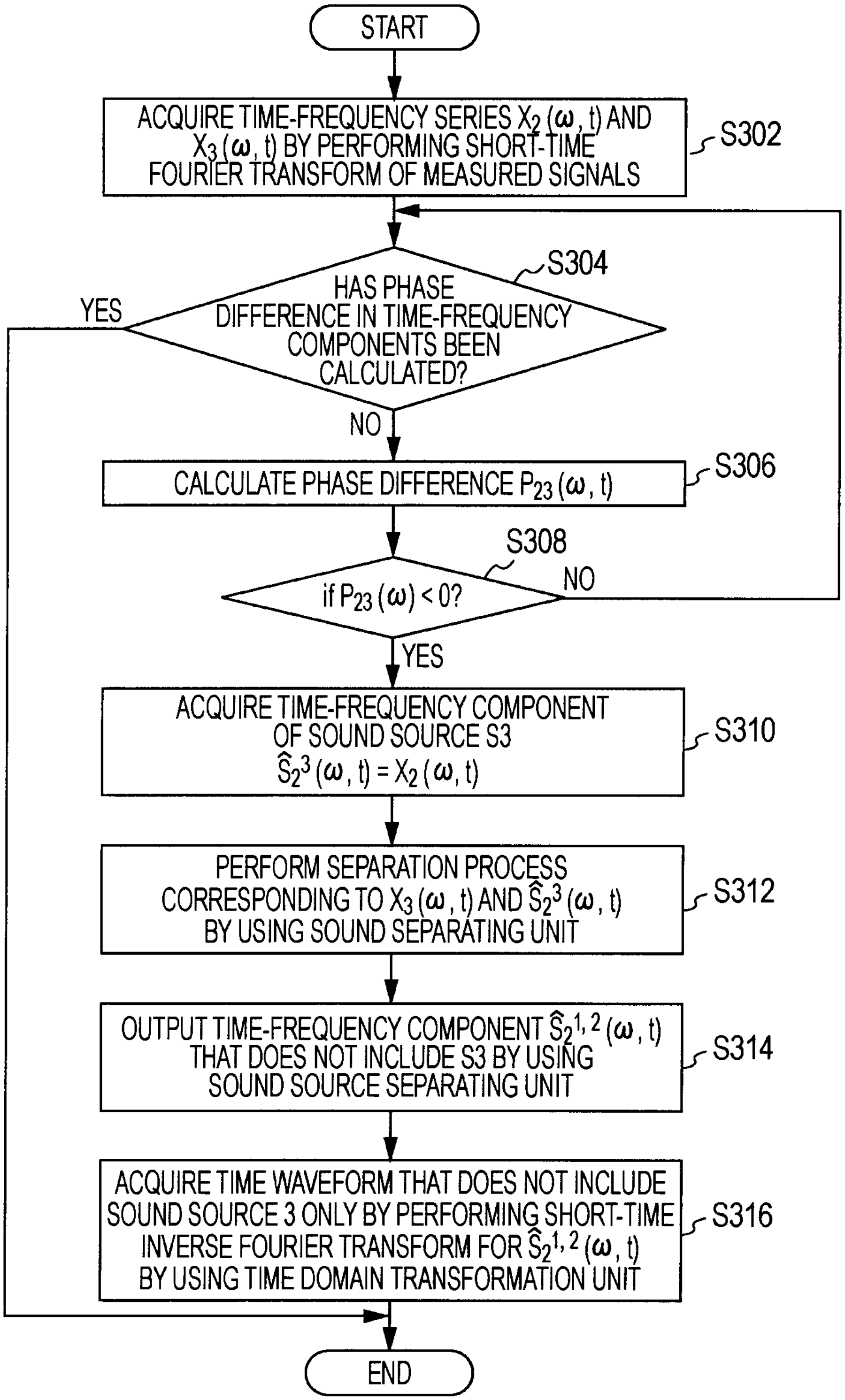
FIG. 18 is a flowchart representing a sound processing method according to the example.

Next, a case (N>M) where the number of sound sources is greater than that of microphones will be described with reference to FIGS. 17 and 18. In particular, a case where the number N of the sound sources is three, and the number M of the microphones two will be described. Also in the second example, a sound processing is performed by the sound processing device 100*a* that is the same as that of the first example. FIG. 17 is a schematic diagram illustrating the positional relationship of the two microphones M2 and M3 and the three sound sources S1 to S3. In the second example, similarly to the first example, the sound source S3 is assumed to be a sound source having high independency among the three sound sources. In other words, the sound source S3 is a dominant sound source that is louder than the other sound sources S1 and S2 or the like. The object of the second example is to eliminate the sound signal of the sound source S3, which is the specific sound source, from a sound signal including the sound sources S1 to S3.

Next, the sound processing method according to the second example will be described with reference to FIG. 18. First, the frequency domain converting unit 101 acquires the following time-frequency series by performing a short-time Fourier transform for observed signals observed by the microphones (S302).

$$X_2(\omega,t),\ X_3(\omega,t) \qquad \text{Numeric Expression 19}$$

Next, it is determined whether or not the phase differences of the time-frequency components acquired in Step S302 have been calculated (S304). In a case where the phase differences of the time-frequency components are determined not to have been calculated in Step S304, the process of Step S306 is performed. On the other hand, in a case where the phase differences of the time-frequency components are determined to have been calculated in Step S304, the process ends. In the case where the phase differences of the time-frequency components are determined to have been calculated in Step S304, the following phase difference of the time-frequency components acquired in Step S302 are calculated.

$$P_{23}(\omega,t) \qquad \text{Numeric Expression 20}$$

Next, it is determined whether or not the phase difference of the microphone pairs satisfies the following Conditional Expression 3 (S308).

Numeric Expression 21

$$\text{if } P_{23}(\omega,t)<0 \qquad \text{Conditional Expression 3}$$

In a case where the phase difference of the microphone pairs is determined to satisfy Conditional Expression 3 in Step S308, the time-frequency component of the sound source S3 that is measured by the microphone 2 is acquired in the following Numeric Expression (S310).

$$\hat{S}_2^3(\omega,t)=X_2(\omega,t) \qquad \text{Numeric Expression 22}$$

Here, the time-frequency component that includes only a sound source j observed by a microphone i is denoted by the following numeric expression.

$$\hat{S}_i^j(\omega,t) \qquad \text{Numeric Expression 23}$$

In this example, the positional relationship between the sound sources and the microphones that is as shown in FIG. 17 is formed, and thus the sound source S3 is a sound source having high independency. Accordingly, the time-frequency component (sound signal) of only the sound source S3 can be acquired by performing a nonlinear process for the observed signal observed by the microphone 2 in Step S310. Then, the sound source separating unit 106 performs a separation process for the following component (S312).

$$X_3(\omega,t),\ \hat{S}_2^3(\omega,t) \qquad \text{Numeric Expression 24}$$

By performing the above-described nonlinear process, a sound signal that includes only the sound source S3 observed by the microphone 2 is acquired. Thus, the signal selecting unit 104 selects two signals of the sound signal that is output by the nonlinear processing unit 102 and includes only the sound source S3 observed by the microphone _M2 and the observed signal observed by the microphone _M3 and inputs the selected signals to the sound source separating unit 106.

Then, the sound source separating unit 106 outputs the following time-frequency component that does not include the sound source S3 (S314).

$$\hat{S}_2^{1,2}(\omega,t) \qquad \text{Numeric Expression 25}$$

Then, the time domain converting unit 110 acquires a time waveform that does not include only the sound source 3 by performing a short-time inverse Fourier transform for the above-described time-frequency component that does not include the sound source S3 (S316).

The sound source separating unit 106 to which the two signals of the sound signal that includes only the sound source S3 observed by the microphone 2 and the observed signal that is observed by the microphone 3 are input as described above performs a sound source separating process by using the ICA so as to increase the independency of the output signal. Accordingly, the sound signal that includes only the sound source S3 having high independency is directly output. In addition, the sound source S3 is eliminated from the observed signal observed by the microphone 3 so as to be output. As described above, by separating the sound signal including the sound source having high independency through the nonlinear process in a simplified manner, the sound signal that does not include only the sound source having high independency can be effectively acquired.

As above, the preferred embodiment of the present invention has been described in detail with reference to the accompanying drawings. However, the present invention is not limited thereto. It is apparent that various changed examples or modified examples can be reached within the scope of the technical idea as defined in the claims by those skilled in the art, and it is naturally understood that such examples belong to the scope of the present invention.

For example, in the above-described embodiment, the sound processing is performed for the sound sources that can be approximated as point sound sources. However, the sound processing device 100 according to an embodiment of the present invention may be used under spread noises. For example, under the spread noises, a nonlinear process such as a spectrum subtraction is performed in advance, whereby the noises are reduced. In addition, the separation capability of the ICA can be improved by performing a sound source separating process for the signal of which the noises are reduced by using the ICA.

Figure 19:
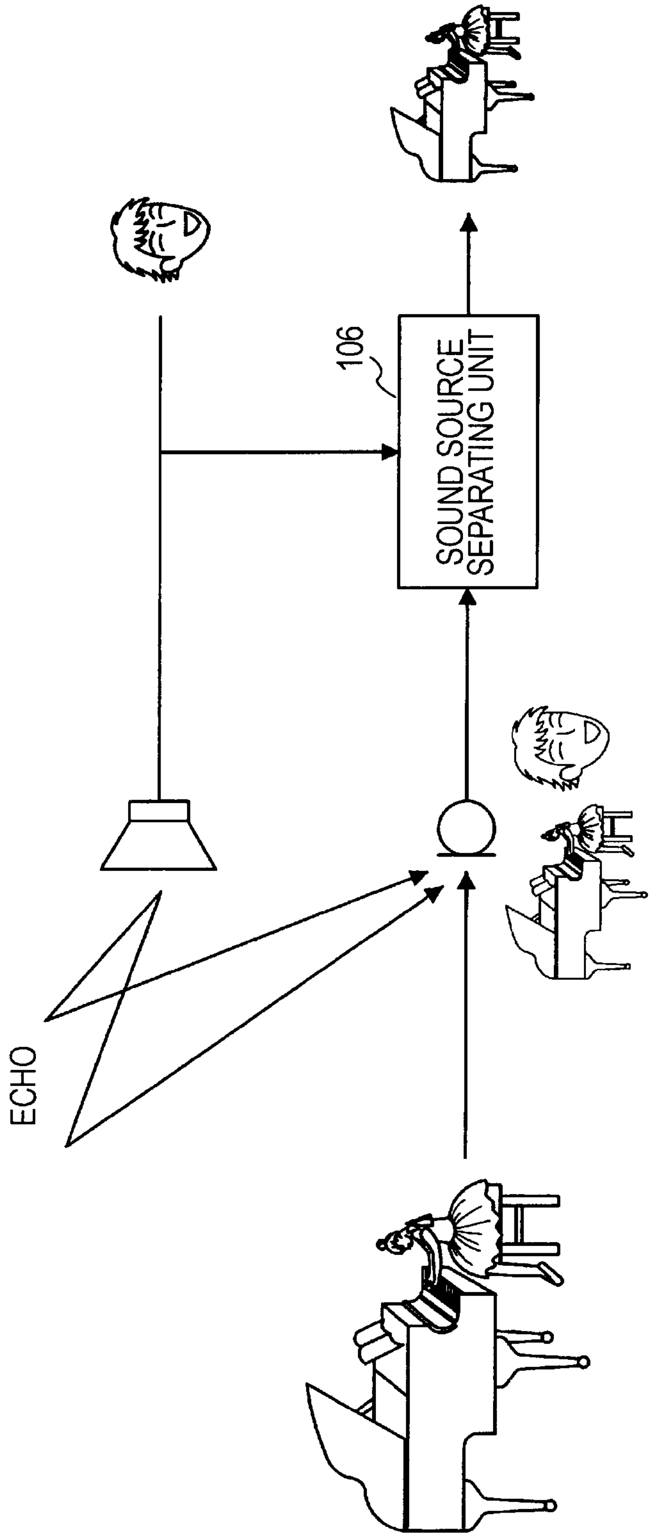
FIG. 19 is a schematic diagram illustrating an application example of the present invention.

In addition, as shown in FIG. 19, the sound processing device 100 according to an embodiment of the present invention may be used as an echo canceller. For example, the sound processing device 100 is used as an echo canceller is a case where a sound source that is desired to be eliminated exists in advance. In such a case, the separation capability of the ICA can be improved by extracting the sound source to be eliminated and inputting the extracted sound source to the sound source separating unit 106.

For example, each step included in the process of the sound processing device 100 described here is not necessarily performed in the order written in the flowchart in a time series. In other words, each step in the process of the sound processing device 100 may be a different process, and the steps may be performed in a parallel manner. In addition, a computer program that is allowed to perform functions equivalent to those of the above-described configurations of the sound processing device 100 can be generated by replacing hardware such as the CPU, the ROM, or the RAM that is built in the sound processing device 100. In addition, a storage medium having the computer program stored therein is also provided.

The present application contains subject matter related to that disclosed in Japanese Priority Patent Application JP 2009-171054 filed in the Japan Patent Office on Jul. 22, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A sound processing device comprising:

a nonlinear processing unit that outputs a plurality of sound signals including sound sources existing in predetermined areas by performing a nonlinear process for a plurality of observed signals that are generated by a plurality of sound sources and are observed by a plurality of sensors;

a signal selecting unit that selects a sound signal including a specific sound source having high independency from among the plurality of sound signals output by the nonlinear processing unit and the observed signal including the plurality of sound sources, wherein the specific sound source having high independency has a statistically higher independency than other sound sources of the plurality of sound sources; and a sound separating unit that separates a sound signal including the specific sound source having high independency that is selected by the signal selecting unit from the observed signal selected by the signal selecting unit, wherein the sound separating unit performs a sound source separating process by using an Independent Component Analysis.

2. The sound processing device according to claim 1, further comprising:

a frequency domain converting unit that converts the plurality of observed signals generated from the plurality of sound sources and observed by the plurality of sensors into signal values of a frequency domain, wherein the nonlinear processing unit outputs a plurality of sound signals including a sound source existing in a specific area by performing a nonlinear process for the observed signal values converted by the frequency domain converting unit.

3. The sound processing device according to claim 1, wherein a specific sound source having high independency is included in the plurality of sound sources that are observed by the plurality of sensors, wherein the nonlinear processing unit outputs a sound signal representing a sound component of the specific sound source having high independency, wherein the signal selecting unit selects an observed signal including the specific sound source and the sound sources other than the specific sound source from among a sound signal representing the sound component of the specific sound source output by the nonlinear processing unit and the plurality of observed signals, and wherein the sound separating unit eliminates the sound component of the specific sound source from the observed signal selected by the signal selecting unit.

4. The sound processing device according to claim 1, wherein the nonlinear processing unit outputs a sound signal representing a sound component that exists in an area in which a first sound source is generated, wherein the signal selecting unit selects an observed signal including a second sound source that is observed by a sensor located in an area in which the first sound source and a sound source other than the first sound source are generated, from among the sound signal representing the sound component, which is output by the nonlinear processing unit and exists in the area in which the first sound source is generated, and the plurality of observed signals, and wherein the sound separating unit eliminates the sound component of the first sound source from the observed signal, which includes the second sound source, selected by the signal selecting unit.

5. The sound processing device according to claim 1, wherein the nonlinear processing unit includes:

phase calculating means that calculates a phase difference between the plurality of sensors for each time-frequency component;

determination means that determines an area from which each time-frequency component originates based on the phase difference between the plurality of sensors that is calculated by the phase calculating means; and calculation means that performs predetermined weighting for each time-frequency component observed by the sensor based on a determination result of the determination means.

6. The sound processing device according to claim 5, wherein the phase calculating means calculates the phase difference between the sensors by using a delay between the sensors.

7. The sound processing device according to claim 1, wherein the plurality of observed signals corresponding to the number of the plurality of sensors are observed, and wherein the signal selecting unit selects the sound signals corresponding to a number that becomes the number of the plurality of sensors together with one observed signal, from among the plurality of sound signals output by the nonlinear processing unit.

8. The sound processing device according to claim 1, wherein the nonlinear processing unit outputs a first sound signal representing the sound component of the specific sound source having high independency and a second sound signal that does not include all the sound components of three sound sources by performing a nonlinear process for three observed signals generated from the three sound sources including the specific sound source having high independency and observed by three sensors, wherein the signal selecting unit selects the first sound signal and the second sound signal that are output by the non-linear processing unit and the observed signal that includes the specific sound source and a sound source other than the specific sound source, and wherein the sound separating unit eliminates the sound component of the specific sound source from the observed signal selected by the signal selecting unit.

9. The sound processing device according to claim 1, wherein the nonlinear processing unit outputs a sound signal representing the sound component of the specific sound source having high independency by performing a nonlinear process for two observed signals generated from three sound sources including the specific sound source having high independency and observed by two sensors, wherein the signal selecting unit selects the sound signal output by the nonlinear processing unit and the observed signal that includes the specific sound source and a sound source other than the specific sound source, and wherein the sound separating unit eliminates the sound component of the specific sound source from the observed signal selected by the signal selecting unit.

10. A sound processing method comprising the steps of:

outputting a plurality of sound signals including sound sources existing in predetermined areas by performing a nonlinear process for a plurality of observed signals that are generated by a plurality of sound sources and are observed by a plurality of sensors;

selecting a sound signal including a specific sound source having high independency from among the plurality of sound signals output by the nonlinear process and the observed signal including the plurality of sound sources, wherein the specific sound source having high independency has a statistically higher independency than other sound sources of the plurality of sound sources; and separating a sound signal including the specific sound source having high independency that is selected in the selecting of a sound signal and the observed signal from the selected observed signal, wherein separating the sound signal includes performing a sound source separating process by using an Independent Component Analysis.

11. A non-transitory computer readable medium executed by a computer to serve as a sound processing device comprising:

a nonlinear processing unit that outputs a plurality of sound signals including sound sources existing in predetermined areas by performing a nonlinear process for a plurality of observed signals that are generated by a plurality of sound sources and are observed by a plurality of sensors;

a signal selecting unit that selects a sound signal including a specific sound source having high independency from among the plurality of sound signals output by the nonlinear processing unit and the observed signal including the plurality of sound sources, wherein the specific sound source having high independency has a statistically higher independency than other sound sources of the plurality of sound sources; and a sound separating unit that separates a sound signal including the specific sound source having high independency that is selected by the signal selecting unit from the observed signal selected by the signal selecting unit, wherein the sound separating unit performs a sound source separating process by using an Independent Component Analysis.

* * * * *